United States Patent
Yang et al.

(10) Patent No.: US 11,875,006 B1
(45) Date of Patent: Jan. 16, 2024

(54) SELF-CAPACITOR SENSING USING ALTERNATING-CURRENT-MODE BRIDGE FOR CAPACITIVE TOUCH PANELS

(71) Applicant: Shenzhen Goodix Technology Co., Ltd., Shenzhen (CN)

(72) Inventors: Chao Yang, San Diego, CA (US); Mohamed Elsayed, San Diego, CA (US); Dazhi Wei, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/187,648

(22) Filed: Mar. 21, 2023

(51) Int. Cl.
G06F 3/045 (2006.01)
G06F 3/044 (2006.01)
G06F 3/041 (2006.01)

(52) U.S. Cl.
CPC .......... G06F 3/0446 (2019.05); G06F 3/0418 (2013.01); G06F 3/04166 (2019.05); *G06F 3/0445* (2019.05); *G06F 2203/04111* (2013.01)

(58) Field of Classification Search
CPC .. G06F 3/0446; G06F 3/04166; G06F 3/0418; G06F 3/0445
USPC ........................................................ 345/174
See application file for complete search history.

(56) References Cited

U.S. PATENT DOCUMENTS

| 2015/0293155 A1* | 10/2015 | Joet | G01R 17/105 |
| | | | 324/706 |
| 2021/0048934 A1* | 2/2021 | Van Ostrand | G06F 3/03545 |
| 2021/0389354 A1* | 12/2021 | Huynh | G01R 19/257 |

* cited by examiner

*Primary Examiner* — Jonathan M Blancha
(74) *Attorney, Agent, or Firm* — Kilpatrick Townsend & Stockton LLP

(57) ABSTRACT

Techniques are described for using an alternating-current-mode (AC-mode) bridge for low-noise self-capacitor sensing in a capacitive touch panel array integrated with a display panel. Each channel of the array has a self-capacitance ($C_i$) that changes responsive to presence or absence of a local touch event local. Pairs of channels are read out differentially by coupling pairs of channels to branches of an AC-mode bridge. The AC-mode bridge includes current sources that drive each branch (and thereby each channel) with a sinusoidal current, manifesting a branch voltage on each branch based on the self-capacitance of the branch. The branch voltages are used to generate an output voltage. The sinusoidal current is controlled by comparing a driver signal with feedback from the branches, so that common-mode noise on the channels becomes a common-mode component of the sinusoidal currents and is rejected in the generation of the output voltage.

20 Claims, 13 Drawing Sheets

SELF-CAPACITOR SENSING USING ALTERNATING-CURRENT-MODE BRIDGE FOR CAPACITIVE TOUCH PANELS

TECHNICAL FIELD

The present document relates to sensing circuits, and, more particularly, to continuous-time self-capacitor sensing approaches utilizing an alternating-current-mode bridge, such as for use in large capacitive touch panels.

BACKGROUND

Many modern electronics applications include integrated touch panels, such as touchscreen displays. Typically, touch-sensing layers of a touchscreen display use capacitive sensing to determine when and where a user is touching the display. Display noise can couple into the touch-sensing layers, which can manifest as noise in the readout of capacitive touch-sensing information. Over time, there has tended to be a continuing increase in such display noise coupling, and it has become increasingly challenging to provide sufficiently low-noise read-out circuits for such applications.

Often, the touch-sensing layers of the display include an array of "mutual capacitors" and "self-capacitors." For example, there is a self-capacitor for each row and for each column of the array, and there is a mutual capacitor at each row-column intersection of the array. The mutual capacitors in the touch panel tend to be the primary sensing elements because they tend to provide more accurate information regarding touch (e.g., finger) locations. Still, self-capacitor sensing can provide a useful alternative (or supplemental) source of touch-sensing information, especially for cases in which mutual-capacitor sensing tends to be inaccurate (e.g., when a user has wet fingers).

However, self-capacitor sensing can be more challenge, due to smaller signal levels than those obtained with mutual capacitor sensing. The change in capacitance induced in a self-capacitor during a touch even may typically be only a small fractional of its base capacitance value. The self-capacitor sensitivity can be reduced even further as the display size increases. Reliably sensing such small changes in capacitance can involve designing very high-performance sensing circuits.

BRIEF SUMMARY

Embodiments disclosed herein include systems and methods for using an alternating-current-mode (AC-mode) bridge for self-capacitor sensing in a capacitive touch panel, such as integrated into a display of a touchscreen electronic device. For example, a touch panel array is integrated with a display panel and has multiple touch sense channels. Each channel has a respective channel self-capacitance (Ci) that includes a respective base self-capacitance (Cs) corresponding to display noise capacitively coupled onto the channel from the display panel and a respective touch capacitance (Ctouch) that changes responsive to presence of a touch event local to the channel. Pairs of channels are read out differentially by coupling pairs of channels to branches of an AC-mode bridge. For example, ith and jth channels are coupled to two branches of an AC-mode bridge. The AC-mode bridge includes current sources that drive each branch (and thereby each channel) with a sinusoidal current, manifesting a branch voltage on each branch based on the self-capacitance of the branch. These two branch voltages are used to generate a differential output voltage. The sinusoidal current is controlled by comparing a driver signal with feedback from the branches, so that common-mode noise on the channels becomes a common-mode component of the sinusoidal currents and is rejected in the generation of the output voltage.

According to a first set of embodiments, a system is provided for self-capacitor sensing in a touch panel array integrated with a display panel. The system includes: an alternating-current-mode (AC-mode) bridge having: an error amplifier to generate a loop control voltage responsive to a sinusoidal driver signal and an error feedback signal; a first branch to couple with an ith channel of a touch panel array having an ith channel self-capacitance (Ci_i), and a second branch to couple with a jth channel of a touch panel array having a jth channel self-capacitance (Ci_j); a set of adjustable current sources configured, based on the loop control voltage, to output a first sinusoidal current to the first branch and to output a second sinusoidal current to the second branch, wherein the first branch manifests a first branch voltage responsive to applying the first sinusoidal current to Ci_i, and the second branch manifests a second branch voltage responsive to applying the second sinusoidal current to Ci_j, the error feedback signal being a function of the first branch voltage and the second branch differential voltage; and an output amplifier to generate an ith output voltage (Vout_i) based on a difference between the first branch voltage and the second branch voltage.

According to another set of embodiments, a method is provided for self-capacitor sensing in a touch panel array integrated with a display panel. The method includes: (a) coupling a first branch of an alternating-current-mode (AC-mode) bridge to an ith channel of the touch panel array having an ith channel self-capacitance (Ci_i), and coupling a second branch of the AC-mode bridge to a jth channel of the touch panel array having a jth channel self-capacitance (Ci_j); (b) generating a loop control voltage responsive to a sinusoidal driver signal and an error feedback signal, the error feedback signal being a function of a first branch voltage on the first branch and a second branch voltage on the second branch; (c) generating first and second sinusoidal currents based on the loop control voltage; (d) driving the first branch with the first sinusoidal current to manifest the first branch voltage based on Ci_i; (e) driving the second branch with the second sinusoidal current to manifest the second branch voltage based on Ci_j; and (f) generating an ith output voltage (Vout_i) based on a difference between the first branch voltage and the second branch voltage.

The drawings, the description and the claims below provide a more detailed description of the above, their implementations, and features of the disclosed technology.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Many modern electronics applications include integrated touch panels, such as touchscreen displays. Typically, touch-sensing layers of a touchscreen display use capacitive sensing to determine when and where a user is touching the display. Display noise can couple into the touch-sensing layers, which can manifest as noise in the readout of capacitive touch-sensing information. Over time, there has tended to be a continuing increase in such display noise coupling, and it has become increasingly challenging to provide sufficiently high-performance read-out circuits for such applications.

Figure 1:
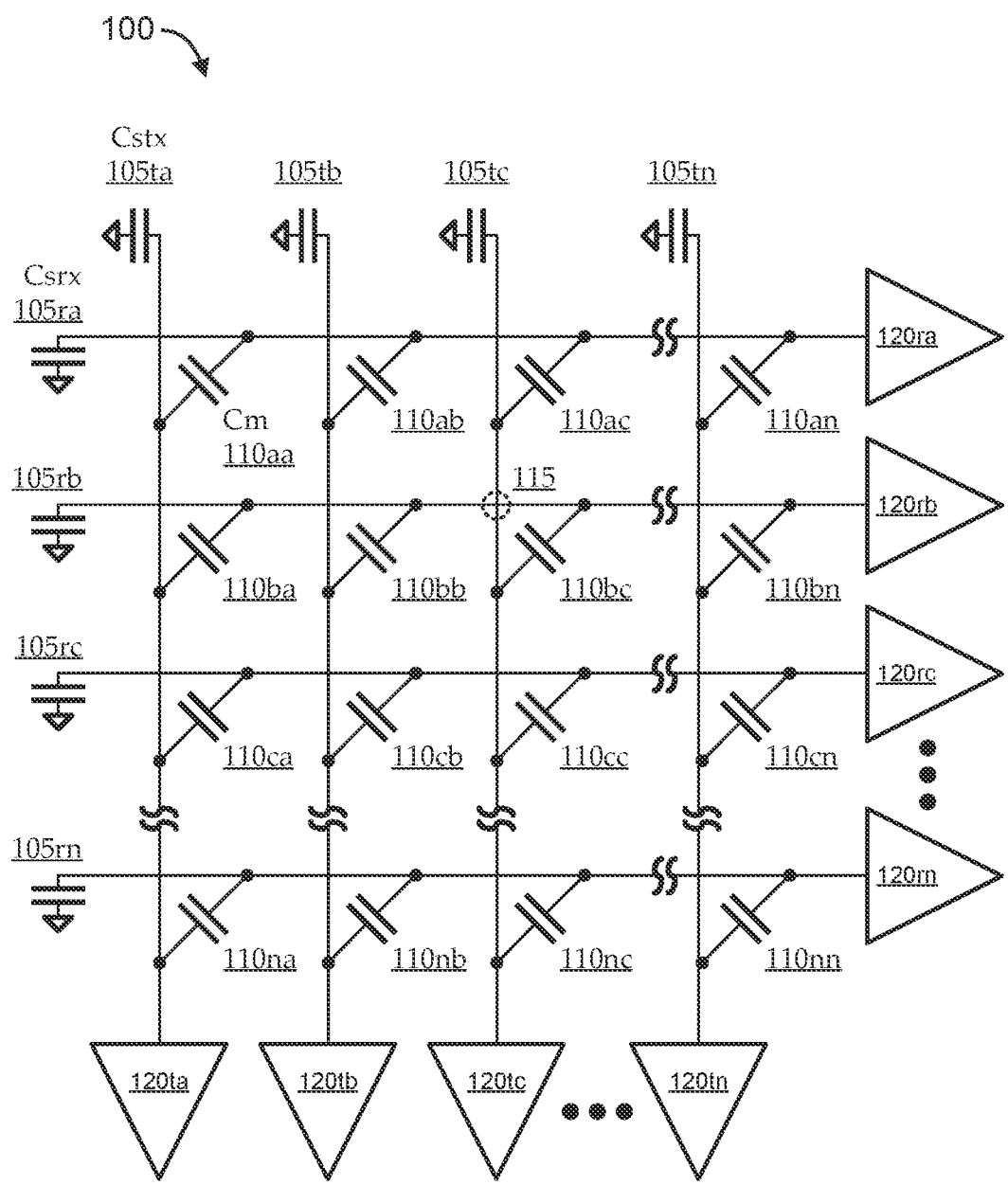
FIG. 1 shows a simplified portion of an illustrative touch panel array having rows and columns.

FIG. 1 shows a simplified portion of an illustrative touch panel array 100 having rows and columns. In general, the touch panel array 100 is configured to sense when and where a user touches the array by sensing a change in capacitance and associating the sensed change to a particular row-column intersection location. A "mutual capacitor" (Cm) 110 (illustrated as 110aa-110nn) is located at each row-column intersection location. Additionally, each row and each column of the array 100 is coupled with a respective "self-capacitor" (Cs) 105 (illustrated as Csrx 105ra-105m and Cstx 105ta-105tn). The row-wise self-capacitors are labeled "Csrx", and the column-wise self-capacitors are labeled "Cstx."

As used herein, a touch event is considered as any touch interaction with the touch panel array 215 that is detectable by any one or more of the touch sense circuits 120. A touch event is considered herein to be "local" to a particular row or column line when the touch event is sufficiently proximate to the particular row or column line so as to manifest as a change in capacitance (mutual capacitance and/or self-capacitance) that is detectable by at least the touch sense circuit 120 coupled with that particular row or column line. Correspondingly, a touch event is considered herein to be local to a particular self-capacitor 105 when the touch event is sufficiently proximate to the particular row or column line coupled with the self-capacitor 105 so as to manifest as a change in self-capacitance that is detectable by at least the touch sense circuit 120 coupled with the particular row or column line; and a touch event is considered herein to be local to a particular mutual capacitor 110 when the touch event is sufficiently proximate to the mutual capacitor 110 so as to manifest as a change in mutual-capacitance that is detectable by at least the touch sense circuit 120 receiving the signal driven through the mutual capacitor 110. Similarly, a touch event is considered herein to be local to a particular touch sense circuit 120 when the touch event is sufficiently proximate to any portion of the touch panel array 100 so as to manifest as a change in mutual-capacitance and/or self-capacitance that is detectable by at least the particular touch sense circuit 120.

For example, a touch event occurring (e.g., a finger being placed) at the circled row-column intersection location 115 can cause a detectable change in capacitance relating to mutual capacitor 110bc, row-wise self-capacitor 105rb, and column-wise self-capacitor 105tc. As such, the touch event can be considered as local to at least: the third column line, the second row line, row-wise self-capacitor 105rb, column-wise self-capacitor 105tc, mutual capacitor 110bc, touch sense circuit 120rb, and touch sense circuit 120tc. In some cases, the same touch event may be local to (i.e., and therefore detectable in relation to) multiple adjacent row lines, column lines, self-capacitors 105 and/or mutual capacitors 110.

Although not explicitly shown as such, the touch panel array 100 can be integrated as part of a display, such as a touchscreen display of an electronic device. The grid of row lines and column lines effectively provides a number of touch sense channels. The mutual capacitors 110 in the touch panel array 100 tend to be the primary sensing elements because they tend to provide more accurate information regarding touch (e.g., finger) locations. Mutual capacitance of one of the mutual capacitors 110 is typically measured by driving a signal through the column and row lines coupled with the mutual capacitor 110, and measuring the output. For example, measuring the capacitance of mutual capacitor 110bc can involve coupling a driver (not shown) with the column line corresponding to column-wise self-capacitor 105tc. The driver can transmit a signal through the column line, and the signal is coupled, via mutual capacitor 110bc, onto the row line corresponding to row-wise self-capacitor 105rb. The signal can then be received at a touch sense circuit 120rb coupled with the row line, and measured to detect any change in capacitance indicating presence of a touch event at the mutual capacitor 110bc.

In addition to mutual-capacitor 110 sensing, self-capacitor 105 sensing can provide a useful alternative (or supplemental) source of touch-sensing information, especially for cases in which mutual-capacitor 110 sensing tends to be inaccurate (e.g., when a user has wet fingers). Although the self-capacitors 105 are illustrated in FIG. 1 as discrete devices, each self-capacitor 105 represents an aggregate parasitic capacitance over the corresponding row line or column line with illustrated as coupled with the self-capacitor 105 is coupled. For example, as noted above, the touch panel array 100 can be integrated with a display, and the parasitic capacitance of the self-capacitors 105 can manifest from capacitively coupled display noise. Measuring the self-capacitors 105 typically does not involve driving a signal through row or column lines of the touch panel array 100. Rather, as illustrated in FIG. 1, each row line and each column line is coupled with a respective touch sense circuit 120 (illustrated as touch sense circuits 120ra-120rn for the row-lines and as touch sense circuits 120ta-120tn for the column lines). As described herein, a touch event proximate to a particular row or column line can manifest as a change in self-capacitance sense by the touch sense circuit 120 coupled with that row or column line.

Figure 2:
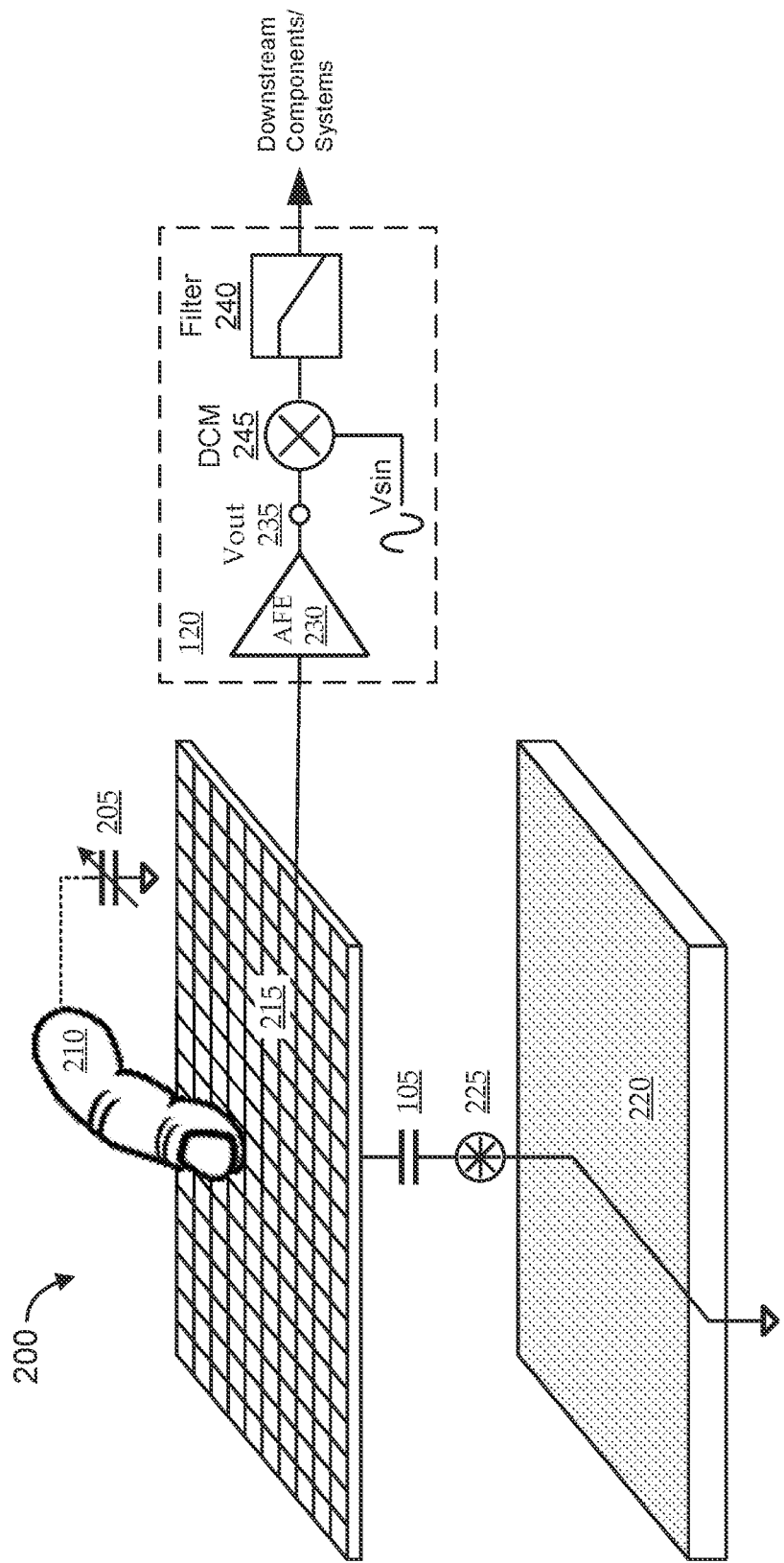
FIG. 2 shows a simplified portion of a touch sensing environment to further illustrate self-capacitor sensing.

FIG. 2 shows a simplified portion of a touch sensing environment 200 to further illustrate self-capacitor sensing. The illustrated environment shows a touch panel array 215 (e.g., implemented by touch panel array 100 of FIG. 1) integrated with a display panel 220. Typically, a common cathode layer (e.g., which can be considered as a local ground plane) of the display panel 220 faces the touch panel array 215. Capacitively coupled display noise 225 from the display panel 220 manifests at the touch panel array 215 as self-capacitance (i.e., a parasitic capacitance) on the row and column lines of the touch panel array 215, which can be represented (e.g., as in FIG. 1) as self-capacitors 105 coupled with those row and column lines. Only one self-capacitor 105 is shown to avoid over-complicating the figure.

As discussed with reference to FIG. 1, each row and column line can be coupled with a respective touch sense circuit 120 (only one is shown). Embodiments of the touch sense circuit 120 typically include an analog front-end (AFE) 230 that generates a channel sense output voltage (Vout) 235. It can be desirable to include an up-converting stage in the AFE 230 to up-convert the input (direct-current, DC) signal to a higher frequency to help eliminate AFE low-frequency noise. The AFE 230 path then includes a subsequent down-converting mixer (DCM) 245 to move the signal back to DC. A filter 240 after the DCM 245 can help keep the DC signal, while eliminating higher frequency spurs. For example, without up-conversion, the output of the AFE 230 is typically a DC magnitude (e.g., resulting from an average magnitude over a series of single-polarity pulses). The up-converting stage can result in the output of the AFE 230 being a series of pulses with alternating polarity, so that the detected signal is represented as a magnitude at a particular frequency (i.e., not DC, and with low-frequency noise effectively removed). The DCM 245 can then mix the AFE 230 output with a sinusoid of the same frequency to produce a DC output signal corresponding to the DC input signal.

When there is no touch event local to the touch sense circuit 120, the touch sense circuit 120 is configured to generate the Vout 235 based on a channel capacitance corresponding to a base capacitance value of the corresponding self-capacitor 105. When a touch event is present, the amount of self-capacitance manifest by self-capacitor 105 changes. For example, as illustrated, a finger 210 touching the touch panel array 215 can manifest as a touch capacitance 205 providing a parallel capacitive path to ground. This can effectively increase the apparent self-capacitance of any self-capacitors 105 local to the touch event. Accordingly, the touch sense circuit 120 is configured to generate the Vout 235 based on an increased channel capacitance corresponding to the base capacitance value of the corresponding self-capacitor 105 plus the additional parallel capacitance provided by the touch event (i.e., channel capacitance=Cs 105+Ctouch 205).

While this type of self-capacitor 105 sensing can be effective, it can tend to be more challenge than mutual-capacitor 110 sensing at least because self-capacitor sensing tends involve much smaller signal levels than those obtained with mutual capacitor 110 sensing. The change in capacitance induced in a self-capacitor 105 during a local touch even may typically be only a small fractional of its base capacitance value. For example, there may typically be less than a 0.1-percent difference in measured capacitance between a touch and a non-touch condition. To reliably sense such a small change in capacitance, sensing circuits can be designed to effectively cancel the base capacitance value with very low read-out noise.

Figure 3:
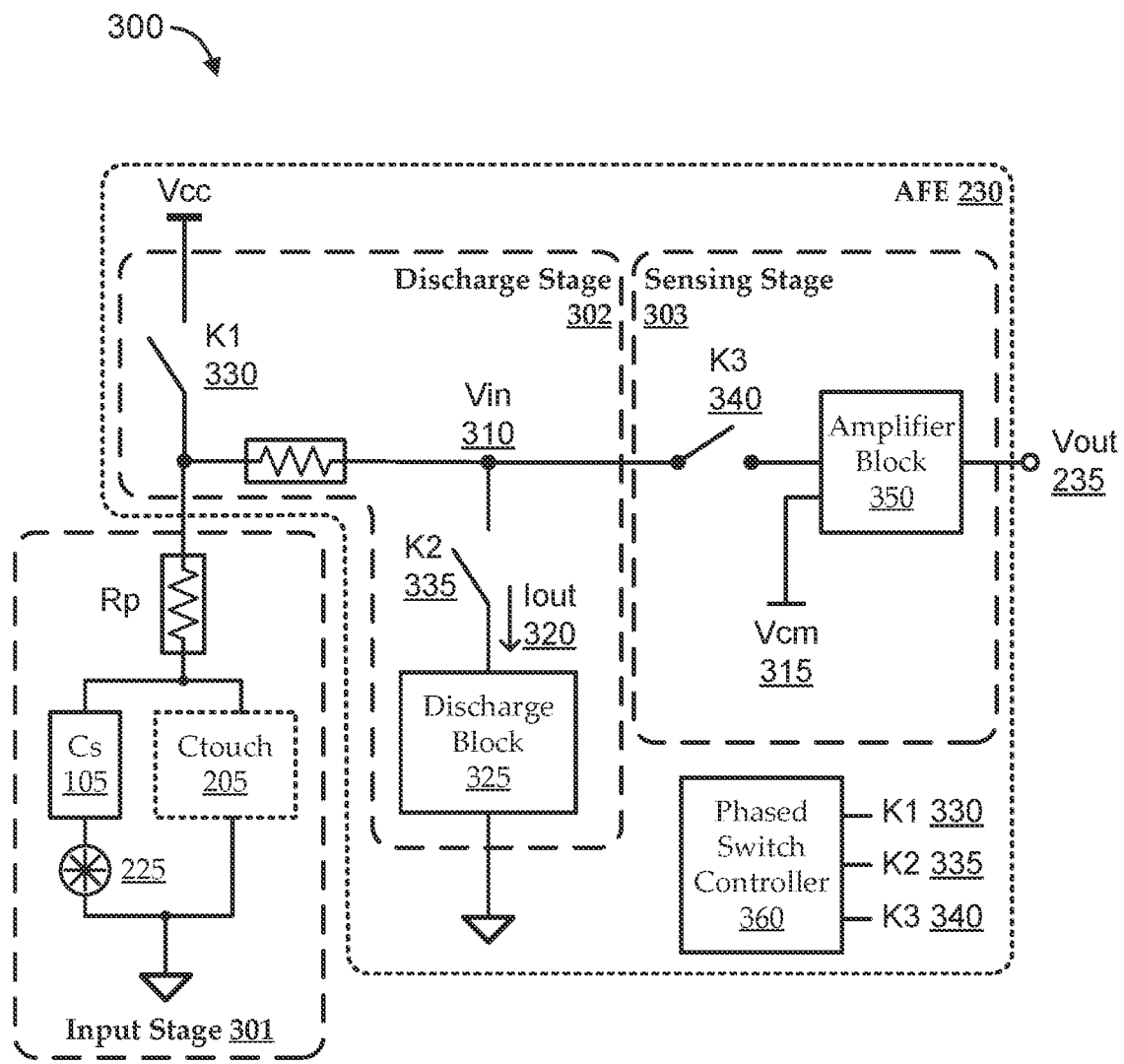
FIG. 3 shows a high-level block diagram of a self-capacitor sensing environment for discrete-time sensing.

FIG. 3 shows a high-level block diagram of a self-capacitor sensing environment 300 for discrete-time sensing. The environment 300 generally includes an input stage 301, a discharge stage 302, and a sensing stage 303. The input stage 301 can represent a particular row line or column line (channel) of a touch panel array (e.g., touch panel array 100 of FIG. 1, touch panel array 215 of FIG. 2, etc.) as seen at the input of a coupled touch sense circuit 120. As described in FIG. 2, the input to the touch sense circuit 120 can be an AFE 230, which can be implemented as the discharge stage 302 and the sensing stage 303 (i.e., as used herein, the AFE 230 is considered to include both the discharge stage 302 and the sensing stage 303). Although particular components are illustrated in particular arrangements and/or stages for the sake of clarity, alternate embodiments can rearrange and/or regroup components without departing from the scope of embodiments described herein.

Input stage 301 represents a particular channel of a capacitive touch sense array, as seen by the AFE 230. As described above, a base capacitance of a self-capacitor 105 for a channel corresponds to capacitively coupled display noise 225 from an integrated display panel. The total self-capacitance of the channel (Ci) can be represented simplistically as the self-capacitor 105 in parallel with a touch capacitance 205 (i.e., Ci=Cs+Ctouch). The amount of added touch capacitance 205 can be zero in absence of any touch event local to the self-capacitor 105, or some detectable (e.g., Ctouch>0) value in presence of a touch event local to the self-capacitor 105. The input stage 301 is further illustrated as having an impedance, as represented in FIG. 3 by resistors. The output of the input stage 301 can manifest as an input voltage level at an input voltage node (Vin) 310 of the AFE 230.

Figure 4:
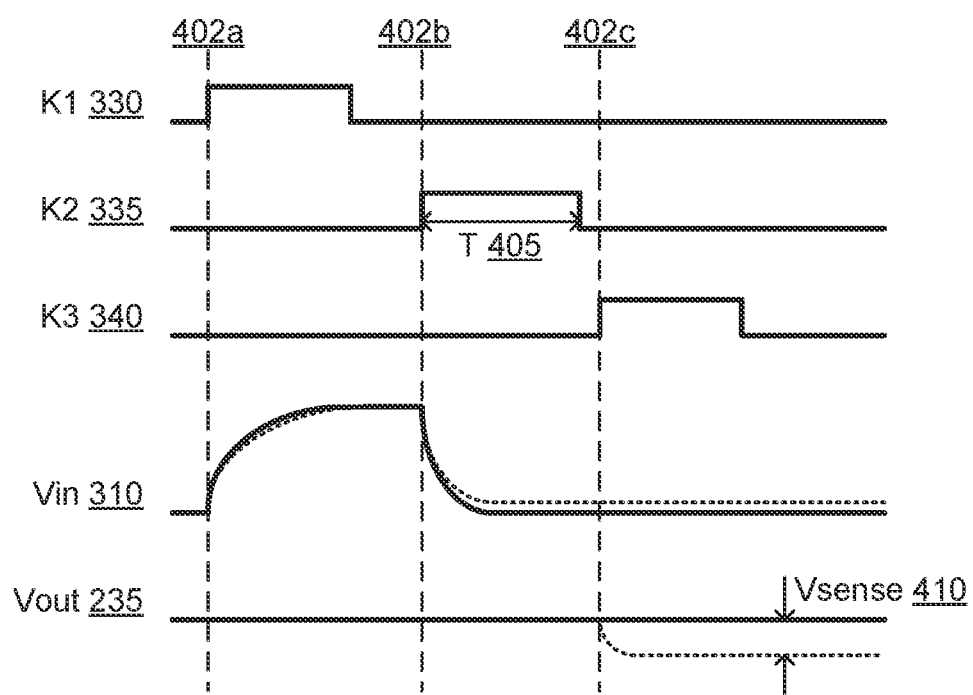
FIG. 4 shows simplified illustrative waveforms and timing at the three phases of operation.

Operation of the stages of FIG. 3 generally follows three phases corresponding to timing of three switches, K1 330, K2 335, and K3 340. The timing of the phases is controlled by a phased switch controller 360. To provide added clarity to the description of FIG. 3, FIG. 4 shows simplified illustrative waveforms and timing at the three phases 402 of operation. Signals used to control particular switches are labeled using the labels of the switches (e.g., the signal labeled "K1 330" in FIG. 4 is the signal used to control switch K1 330 in FIG. 3).

In a first phase 402a, K1 330 is closed for a charging time. As illustrated in FIG. 3, closing K1 330 couples the capacitive input 301 to a source voltage (Vcc) through a resistor (Rp), thereby charging the channel self-capacitance (Ci). Closing K1 330 also effectively couples Vin 310 with Vcc (e.g., via an input impedance, as illustrated), such that the voltage drop between Vin 310 and ground across the capacitive input 301 in series with Rp increases to Vcc (or to some predetermined level below Vcc based on the input impedance) in the first phase 402a. After Ci is charged, K1 330 is opened. FIG. 4 shows an illustrative plot of Vin 310 charging up to the fully charged voltage level. A thicker solid line indicates behavior of Vin 310 in absence of a touch event (Ci=Cs), and a thinner dashed line indicates behavior of Vin 310 in presence of a touch event (Ci=Cs+Ctouch).

In a second phase 402b, K2 335 is closed for a predetermined discharge time (T) 405 (both K1 330 and K3 340 are open). The predetermined discharge time (T) 405 is also referred to herein as a "discrete discharge time," and the self-capacitive sensing approaches described herein can be considered as types of discrete-time sensing approaches, accordingly. As illustrated in FIG. 3, closing K2 335 couples Vin 310 with a discharge block 325. The voltage across Ci and Rp (i.e., relating to Vin 310) is discharged for the predetermined amount of time by a discharge current (Iout) 320, as provided by discharge block 325. The rate of discharge through the discharge block 325 is inversely related to the Ci. As such, the difference in Ci between presence of a local touch event and absence of a local touch event yields a difference in discharge rate through discharge block 325. The illustrative plot of Vin 310 in FIG. 4 shows this effect. The discharging as manifest at Vin 310 is slower in presence of a local touch event (dashed line) than in absence of a local touch event (solid line), due to the increased capacitance of Ci coming from the additional Ctouch 205 when there is a local touch event. The components (at least of the discharge stage 302) are configured to draw a certain amount of charge from Vin 310 so that, at the end of T 405 (i.e., after a discrete discharge time): Vin has been reduced to a discharge reference level (Vcm) 315 in absence of a local touch event (i.e., when Ci=Cs); or Vin has been reduced to a level that is detectably different from (e.g., above) Vcm 315 in presence of a local touch event. Thus, after T 405, when K2 335 is opened, the remaining charge on Ci (and the corresponding level of Vin 310) is detectably different between touch event and non-touch event conditions.

In a third phase 402c, K3 340 is opened (with K1 330 and K2 335 closed). As illustrated in FIG. 3, closing K3 340 couples Vin 310 with an amplifier block 350. The amplifier block 350 is configured to amplify the difference in Vin 310 between touch event and non-touch event conditions, so that the difference can be read out as a reliably detectable difference in channel sense output voltage (Vout) 235 output by the AFE 230. An illustrative plot of Vout 235 is shown in FIG. 4, and an illustrative difference in Vout 235 between the touch event and non-touch event conditions is labeled as Vsense 410. For a typical amplifier block 350 having gain ($\alpha$), Vout 235 can be expressed as:

$$V_{out} = \alpha \frac{(V_{CC} - V_{CM})C_{touch}}{C_S + C_{touch}}.$$

In some implementations, the amplifier block 350 compares Vin 310 with discharge reference level (Vcm) 315. For example, as described above, parameters (e.g., T 405, Iout 320, etc.) are set so that, Vin 235 decays to a level substantially equal to Vcm 315 in the second phase 402b in absence of a local touch event, or Vin 310 decays to a level detectably different from (e.g., greater than) Vcm 315 in presence of a local touch event. For a capacitor, it is known that the capacitor current (Ic) is related to its capacitance and change in voltage over time: Ic=C*(dV/dt). In context of this example implementation, the relationship can be reformulated as: Id*T=(Vcc−Vcm)*Cs. The amplifier block 350 can amplify a difference between Vin 310 and Vcm 315 in the third phase 402c, so that the generated Vout 235 is substantially zero in absence of a touch event (where Vin=Vcm), or the generated Vout 235 manifests a non-zero Vsense 410 level in presence of a touch event (where Vin>Vcm).

As illustrated, embodiments can include, or can be in communication with, a phased switch controller 360. The phased switch controller 360 can output control signals to set the state of switches, such as K1 330, K2, 335, and K3 340. For example, the switches can be transistors, and the control signals can be used to turn the transistors ON or OFF. The phased switch controller 360 can include its own timing control (e.g., a clock, counter, etc.), or the phased switch controller 360 can be in communication with additional components that control timing of the signals output by the phased switch controller 360.

As noted above, when performing self-capacitor 105 sensing of touch events, the signal levels can be very low. For example, the difference in the level of Vin 310 at the end of the second phase 402b between touch and non-touch conditions can be very small. The detection in the third phase 402c depends on discerning between the touch and non-touch levels, which can depend on reliably canceling the base capacitance value of Cs 105. For example, presence of additional noise on either Vin 310 or Vcm 315 can reduce the headroom available for reliable differentiating between touch and non-touch conditions.

Various types of discrete-time operation are widely used for self-capacitor-based touch sensing. Such approaches generally begin by charging Ci (e.g., and a corresponding Vin 310) of each channel to a charged voltage level (e.g., Vcc). In presence of a touch event, part of the charge represents a base self-capacitance value (Cs 105), and part represents additional touch capacitance (Ctouch 205). Techniques seek to cancel the base (Cs 105) portion, so that a residual charge after the canceling represents only the touch (Ctouch 205) portion. Techniques can then convert the residual charge to an output signal, so that the output signal represents only the touch information for the channel. With such approaches, any base portion that still remains after the canceling tends to reduce the sensitivity of the detection. Thus, various conventional approaches have been explored for canceling the base value.

Figure 5:
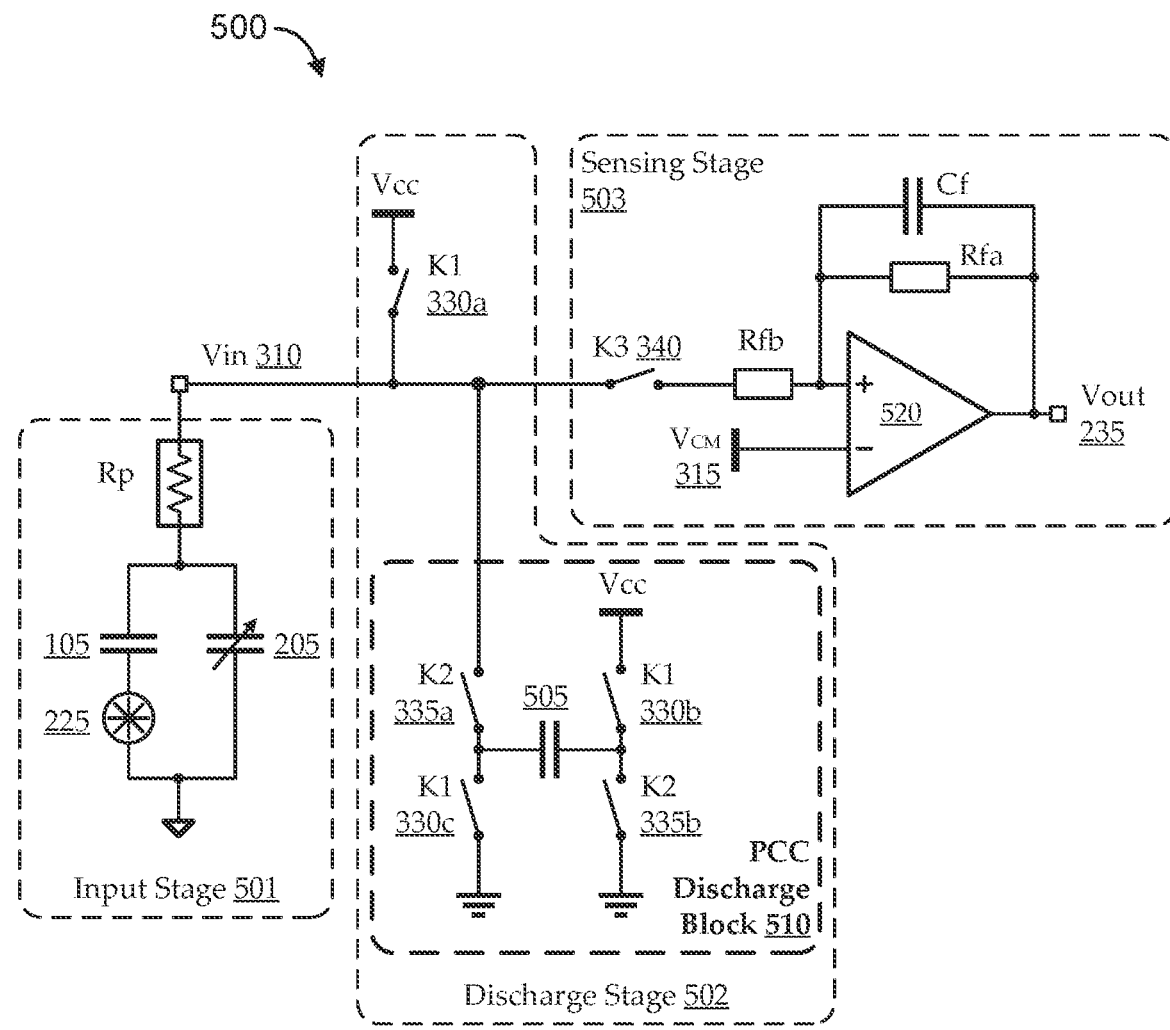
FIG. 5 shows a high-level block diagram of a self-capacitor sensing environment for discrete-time sensing using a conventional pre-charged capacitor (PCC) implementation of a discharge block.
Figure 6:
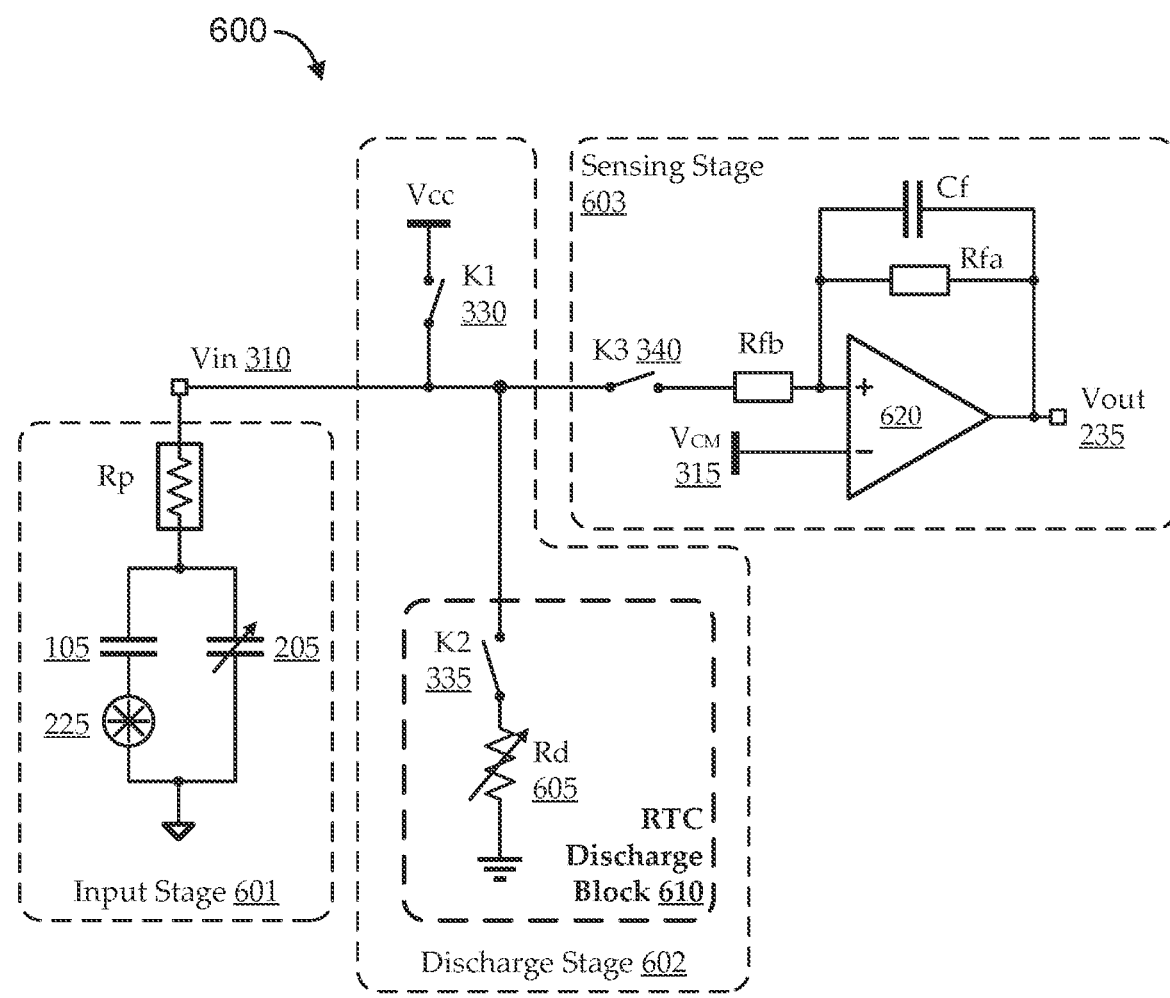
FIG. 6 shows a high-level block diagram of a self-capacitor sensing environment for discrete-time sensing using a conventional resistance-to-time conversion (RTC) implementation of the discharge block.

For added context, FIGS. 5 and 6 illustrated two conventional approaches to canceling base self-capacitance to facilitate touch sensing. FIG. 5 shows a high-level block diagram of a self-capacitor sensing environment 500 for discrete-time sensing using a conventional pre-charged capacitor (PCC) implementation of a discharge block. The environment 500 includes an input stage 501, a discharge stage 502, and a sensing stage 503. The input stage 501 can be substantially the same as the input stage 301 of FIG. 3. For example, inputs stage 501 includes a self-capacitor 105 (manifesting capacitively coupled display noise 225) in parallel with a touch capacitance 205 to form a total channel self-capacitance (Ci). The touch capacitance 205 is represented as a variable capacitor; the touch capacitance 205 is substantially zero when there is no touch event local to the channel, and the touch capacitance 205 is some detectable non-zero amount in presence of a touch event local to the channel. The input stage also include some impedance (Rp).

The discharge stage 502 is implemented as a conventional PCC discharge block 510 having a charging capacitor (Cc) 505. The sensing stage 503 is illustrated generically as including an operational amplifier 520. Similar to FIG. 3, operation of the stages is controlled by various switches, and the timing associated with controlling those switches can be similar to the timing described with reference to FIG. 4. For example, the switches are controlled so that: in a first phase (e.g., corresponding to phase 402a of FIG. 4), switches K1 330 (illustrated as 330a-330c) are set to charge Ci (and Vin 310) to a charged voltage level and to pre-charge Cc 505; in a second phase (e.g., corresponding to phase 402b of FIG. 4), switches K2 335 (illustrated as 335a-335c) are set to use pre-charged Cc 505 to discharge Ci (and Vin 310) to a discharge voltage level; and in a third phase (e.g., corresponding to phase 402b of FIG. 4), switch K3 340 is set to convert the discharge level to an output voltage (Vout 235) representing touch information for the channel.

In particular, in the first phase, switch K1 330a is closed to couple Vin 310 with Vcc, thereby coupling Ci with Vcc through Rp. Concurrently, switches K1 330b and 330c are closed to couple Cc 505 between Vcc 310 and ground. Switches K2 335 are opened, isolating Cc 505 from Vin 310. Thus, while Ci is charging, the PCC discharge block 510 is pre-charging Cc 505. In the second phase, switches K1 330 open and switches K2 335 close. This decouples Cc 505 from its pre-charging path and couples Cc 505 instead with Vin 310. The capacitance of Cc 505 is substantially less than that of Cs 105, so that coupling Cc 505 with Vin 310 causes Cc 505 to pull charge from Ci. As noted above, it can be desirable to configure the discrete-time discharge period (e.g., T 405) and Cc 505 so that the amount of charge pulled away from Cs 105 (Qd) substantially settles Vin 310 as close as possible to Vcm 315. In general, Qd=Id*T, where Id is the discharge current. For this to work properly, the capacitance of Cc 505 is typically selected to be approximately one-third of the capacitance of Cs 105 (e.g., if the capacitance of Cs 105 is 1 nF, Cc 505 can be approximately 330 pF). In the third phase, switch K3 340 is closed to couple discharged Vin 310 with the operational amplifier 620, thereby converting the discharge level (i.e., corresponding to residual charge on Ci) to an output voltage (Vout 235) representing touch information for the channel.

In some applications, use of the PCC discharge block 510 provides various features, such as low sensitivity to clock jitter (particularly in the second phase) due to full settling of operations in each operating phase. However, implementing the PCC discharge block 510 involves providing a Cc 505 for each channel (e.g., each instance of Cs 105 may have a corresponding instance of Cc 505). Particularly where there are tens of channels, or more in a touch panel, the Cc 505 instances can consume a relatively large amount of silicon area, which may be undesirable for many applications.

To avoid the large space penalty associated with the PCC discharge block 510 approach, some conventional implementations use a resistive approach to discharge Ci for each channel over a discrete amount of time. FIG. 6 shows a high-level block diagram of a self-capacitor sensing environment 600 for discrete-time sensing using a conventional resistance-to-time conversion (RTC) implementation of the discharge block. The environment 600 includes an input stage 601, a discharge stage 602, and a sensing stage 603. The input stage 601 can be substantially the same as the input stage 301 of FIG. 3 and the input stage 501 of FIG. 5. For example, inputs stage 601 includes a self-capacitor 105 (manifesting capacitively coupled display noise 225) in parallel with a touch capacitance 205 to form a total channel self-capacitance (Ci). The touch capacitance 205 is represented as a variable capacitor; the touch capacitance 205 is substantially zero when there is no touch event local to the channel, and the touch capacitance 205 is some detectable non-zero amount in presence of a touch event local to the channel. The input stage also include some impedance (Rp).

The discharge stage 602 is implemented as a conventional RTC discharge block 610 having a discharging resistor (Rd) 605 (illustrated as a variable resistor). The sensing stage 603 is illustrated generically as including an operational amplifier 620. Similar to FIGS. 3 and 5, operation of the stages is controlled by various switches, and the timing associated with controlling those switches can be similar to the timing described with reference to FIG. 4. For example, in a first phase (e.g., corresponding to phase 402a of FIG. 4), switch K1 330 is closed to charge Ci (and Vin 310) to a charged voltage level. In a second phase (e.g., corresponding to phase 402b of FIG. 4), switch K1 330 is opened and switch K2 335 is closed to discharge Ci (and Vin 310) to a discharge voltage level through Rd 605. In a third phase (e.g., corresponding to phase 402b of FIG. 4), switch K3 340 is closed to couple Vin 310 with the operational amplifier 620, thereby converting the discharge level (i.e., corresponding to residual charge on Ci) to an output voltage (Vout 235) representing touch information for the channel.

As noted above, the RTC discharge block 610 implementation does not rely on multiple instances of large capacitors (instances of Cc 505) and can be appreciably more space efficient, accordingly. However, because current and voltage are inversely proportional in a resistor, the amount of charge being discharged through Rd 605 varies over the second phase along with the change in Vin 310. As such, the discharging provided by the RTC discharge block 610 can produce a very large (e.g., approximately 40-percent) signal loss. Further, the RTC discharge block 610 can be highly sensitive to clock jitter during discharging. For example, while the discharge period (e.g., T 405) is intended to be a predetermined, discrete amount of time, clock noise can result in slight changes in the width of the pulse used to control the on and off timing of K2 335, which can effectively change the discharge period. It is known that capacitor current (Ic) is related to its capacitance and a change in voltage over time: Ic=C*(dV/dt). If there is added pulse-width time due to clock jitter (Tj), for a discharge current (Id), the voltage error induced at Vin 310 from the jitter (Vin_e) can be described as: Vin_e=Tj*Id/(Cs+Ctouch).

Figure 7:
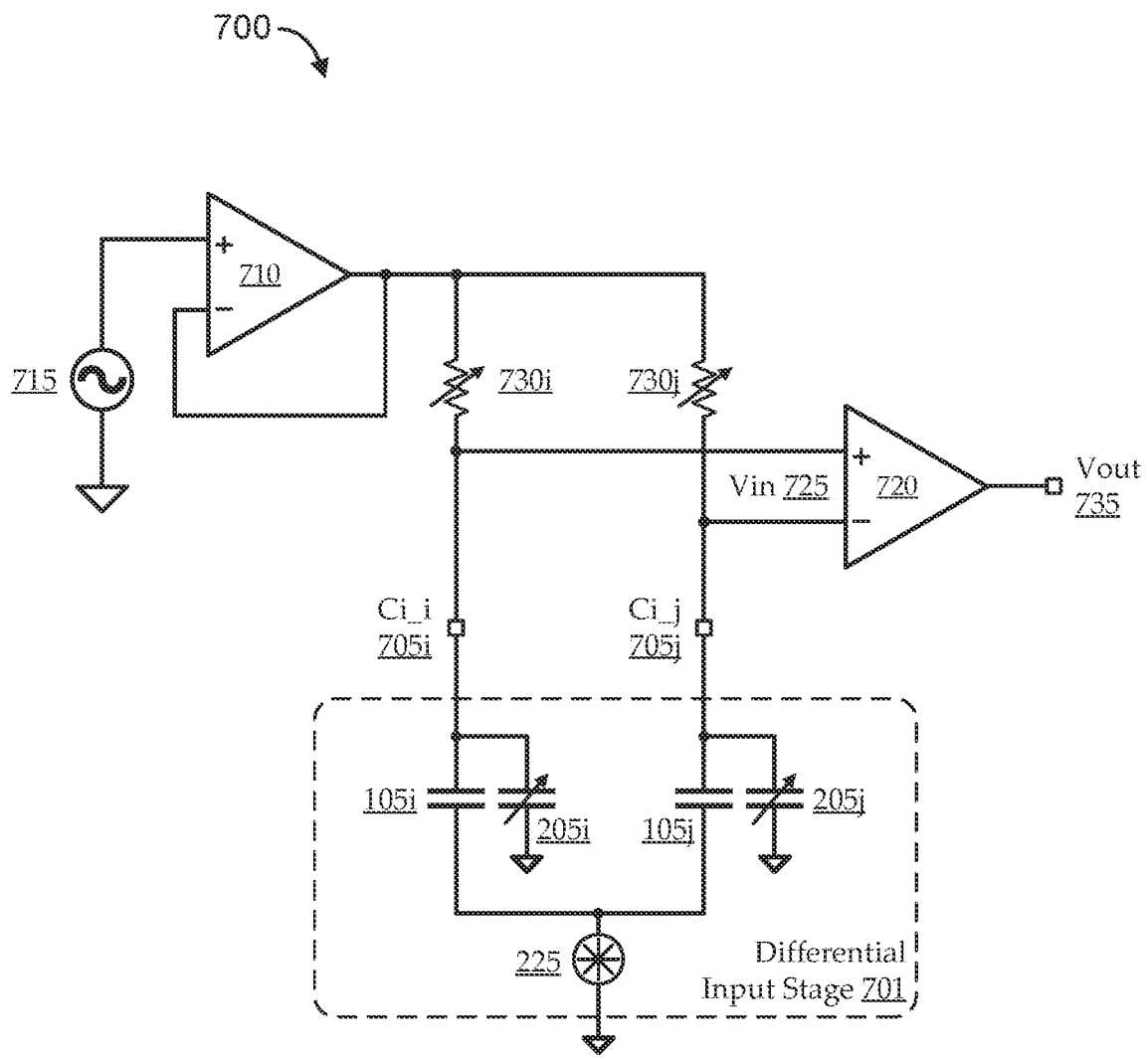
FIG. 7 shows a simplified circuit diagram of an illustrative self-capacitance-based touch sensing system that uses a voltage-mode bridge.

To avoid some of the limitations of PCC- and RTC-based approaches to self-capacitance-based sensing, a voltage-mode bridge has been proposed. FIG. 7 shows a simplified circuit diagram 700 of an illustrative self-capacitance-based touch sensing system that uses a voltage-mode bridge. As illustrated, the voltage-mode bridge approach relies on a differential input stage 701. The differential input stage 701 represents two touch sense channels of a touch panel array, an ith channel and a jth channel. Each channel has a respective total channel capacitance, Ci 705, labeled as Ci_i 705i and Ci_j 705j, respectively. As described herein, each Ci 705 can include a respective base self-capacitance (Cs 105, labeled as 105i and 105j for the ith and jth channels, respectively), manifesting capacitively coupled display noise 225 from an integrated display panel. Each Ci 705 can also include a respective touch capacitance (Ctouch 205, labeled as 205i and 205j for the ith and jth channels, respectively), which varies responsive to presence or absence of a touch event local to the associated channel.

It is generally assumed that, while the display noise 225 can vary across the display panel, it tends to have very little local variance. The illustrated context of FIG. 7 assumes that the ith and jth channels are generally any adjacent channels. The term "adjacent" is used herein to generally refer to any channels or related components (e.g., and any associated metal row or column lines, mutual capacitors, etc.) which are directly adjacent to each other on the touch panel, within several rows of each other on the touch panel, or otherwise sufficiently proximate to each other so that the display noise coupled to those channels can be treated as common-mode noise for cancelation purposes described herein. In some embodiments, the ith and jth channels are directly adjacent channels of a touch panel array (e.g., directly adjacent row lines or directly adjacent column lines). In other embodiments, the ith and jth channels are not directly adjacent, but are proximate enough to experience sufficiently common-mode display noise for purposes of cancelation by sense circuitry described herein.

Because the ith and jth channels are assumed to be adjacent, the display noise 225 is assumed to be common mode noise for the pair of channels. As such, the Cs 105 for both channels of the differential input stage 701 are shown coupled with a same representation of display noise 225. On the same basis, Cs 105i and Cs 105j can be assumed to have substantially the same (e.g., or very close) base self-capacitance, so that any difference between Ci_i 705i and Ci_j 705j is primarily due to differences between Ctouch 205i and Ctouch 205j, representing touch information.

The differential input stage 701 is coupled with a voltage-mode bridge that includes an alternating current (AC) voltage source 715, a driver amplifier 710, an output amplifier 720, and two variable resistors 730 (labeled as resistors 730i and 730j for the ith and jth channels, respectively). The AC voltage source 715 outputs a sinusoidal driver signal, which is buffered (e.g., and amplified) by the driver amplifier 710. Each variable resistor 730 is associated with a respective branch of the voltage-mode bridge. In one branch, variable resistor 730i is coupled at one side with the output of the driver amplifier 710 (i.e., a buffered version of the sinusoidal driver signal), and is coupled at its other side with Ci_i 705i and with one of two differential inputs (e.g., the positive input) of the output amplifier 720. In the other branch, variable resistor 730j is coupled at one side with the output of the driver amplifier 710, and is coupled at its other side with Ci_j 705j and with the other of the two differential inputs (e.g., the negative input) of the output amplifier 720. Thus, the differential inputs to the output amplifier 720 represent a differential input voltage, Vin 725. To maximize output signals in each branch, the resistance of each variable resistor 730 is adjusted to match the impedance of its respective Ci 705 (i.e., variable resistor 730i is matched to the impedance of Ci_i 705i, and variable resistor 730i is matched to the impedance of Ci_j 705j).

During operation, the sinusoidal driver signal from the driver amplifier 710 is used to sinusoidally drive each branch of the voltage-mode bridge, thereby producing a corresponding channel response signal in each branch that corresponds to the Ci 705 associated with the branch. Each channel response signal will include a base component due to the Cs 105 of the branch and a touch component due to the Ctouch 205 of the branch (e.g., the touch component can be absent if there is no local touch event). If as assumed above, Cs 105i and Cs 105j are substantially the same, the respective base components of channel response signals will be substantially the same. At the inputs to the output amplifier, the substantially matching base components will manifest as a common mode portion of Vin 725 and will tend to be ignored (e.g., rejected) by the output amplifier 720. As such, the output generated by the amplifier, Vout 735, will represent the difference between the channel response signals. This difference will primarily be due to touch components of the signals, thereby representing local touch information.

While such an approach can effectively cancel some capacitively coupled display noise, it has certain limitations. One limitation is that, matching each variable resistor 730 to the impedance of its associated Ci 705 essentially forms a voltage divider at each input to the output amplifier. Thus, approximately half of each channel response signal is lost on the corresponding variable resistor 730, and the voltage swing on Ci 705 is only half of what is applied by the sinusoidal driver signal. Another limitation is that around half of the display noise will be transferred to the output amplifier (e.g., to tapping points coupling the differential input stage 701 with the voltage-mode bridge). Even though the display noise appears to the bridge as a common-mode signal and is ultimately rejected by the output amplifier 720, it still consumes input dynamic range of the output amplifier 720. This can reduce the available dynamic range for detecting the differential signal, thereby reducing the sensitivity of the output amplifier 720 to touch information.

The various approaches described above, including the conventional PCC and RTC approaches, and the voltage-mode bridge approach, can be successful in some applications. However, they tend to be highly vulnerable to display noise, which can be much larger than the induced signal changes in a channel due to local touch events. As such, implementing these and other approaches in high-performance applications typically relies on synchronizing touch event sensing to timing of display control signals to reduce the impact of capacitively coupled display noise (i.e., to try to preform sensing operations only while the display noise is relatively low, and to avoid performing sensing operations while the display noise is relatively high). Designing implementations to handle such synchronization can increase system complexity and can reduce system flexibility. Further, as capacitively coupled display noise continues to increase, it can be difficult to find time windows with sufficiently low display noise to support reliable touch sensing with such conventional approaches.

Embodiments described herein include various novel techniques for self-capacitor-based sensing using a current-mode alternating current (AC) bridge for increased sensitivity and a resulting increase in touch-sensing performance. Such embodiments can operate without synchronizing to display control signals. One resulting feature is that embodiments described herein can support self-capacitor sensing in non-synchronized modes of operation. Another resulting feature is that embodiments described herein can support stimulus frequency hopping. Another resulting feature is that embodiments described herein can support higher display noise scenarios, such as where an insufficient amount of display noise is cancelable merely synchronizing sensing to display signals.

Figure 8:
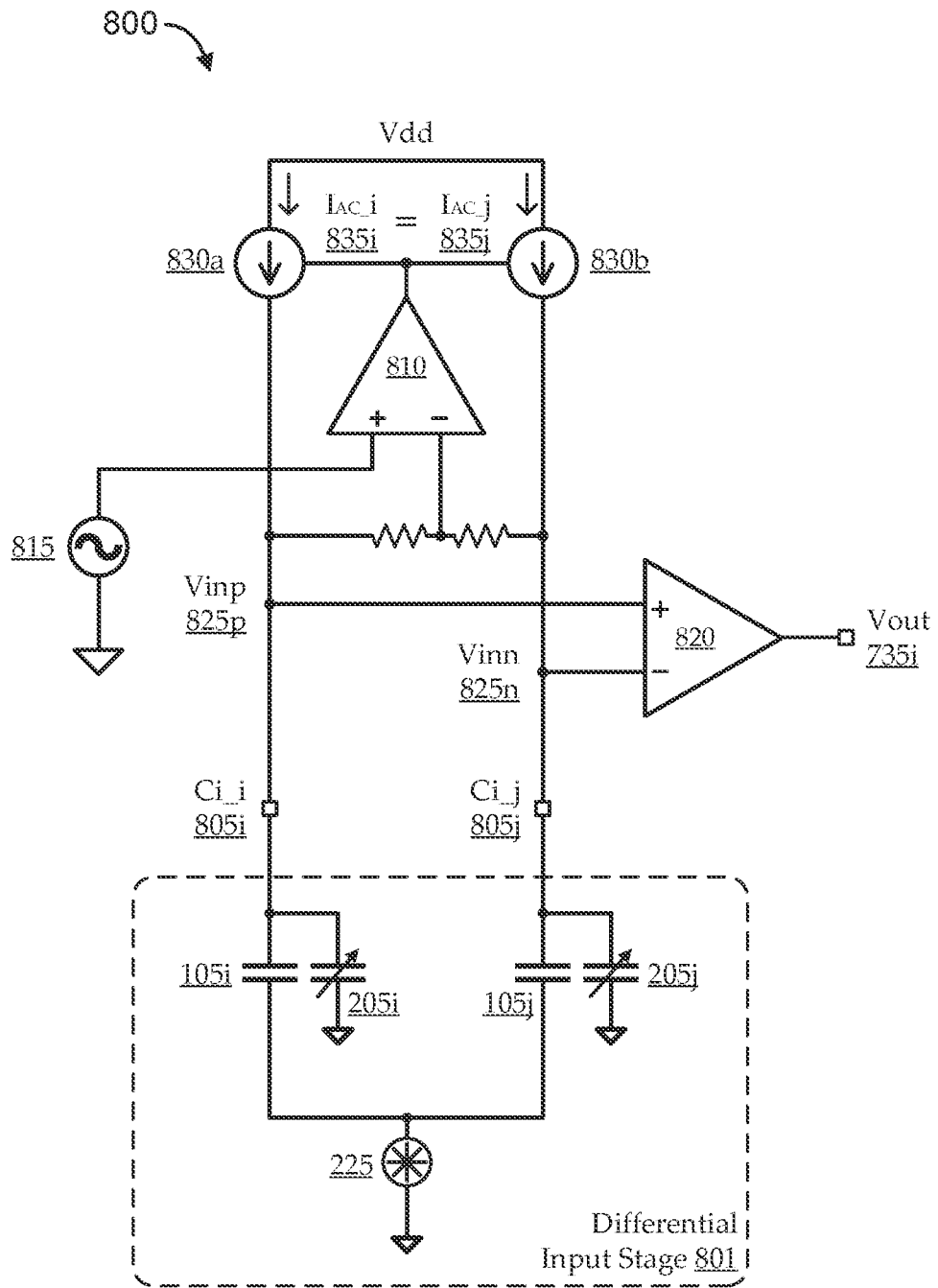
FIG. 8 shows a simplified circuit diagram of an illustrative self-capacitance-based touch sensing system that uses a novel alternating-current-mode (AC-mode) bridge, according to embodiments described herein.

FIG. 8 shows a simplified circuit diagram 800 of an illustrative self-capacitance-based touch sensing system that uses a novel alternating-current-mode (AC-mode) bridge, according to embodiments described herein. Similar to FIG. 7, the AC-mode bridge approach relies on a differential input stage 801 representing two touch sense channels of a touch panel array (an ith channel and a jth channel). Each channel has a respective total channel capacitance, Ci 805, labeled as Ci_i 805i and Ci_j 805j, respectively. As described herein, each Ci 805 can include a respective base self-capacitance (Cs 105, labeled as 105i and 105j for the ith and jth channels, respectively), manifesting capacitively coupled display noise 225 from an integrated display panel. Each Ci 805 can also include a respective touch capacitance (Ctouch 205, labeled as 205i and 205j for the ith and jth channels, respectively), which varies responsive to presence or absence of a touch event local to the associated channel.

The AC-mode bridge includes a sinusoidal voltage source 815, an error amplifier 810, an output amplifier 820, and two adjustable current sources 830. The AC-mode bridge has two branches, each coupled with a respective channel of the differential input stage 801 (i.e., each branch of the AC-mode bridge is effectively coupled with a respective Ci 805). In the first branch, a first adjustable current source 830a is coupled between a local source voltage (Vdd) and a positive branch voltage (Vinp) node 825p, which is coupled with the ith Ci 805i. In the second branch, a second adjustable current source 830b is coupled between a local source voltage (Vdd) and a negative branch voltage (Vinn) node 825n, which is coupled with the jth Ci 805j. The Vinp node 825p and the Vinn node 825n are also coupled with respective differential inputs to the output amplifier 820, such that a voltage difference between the Vinp node 825p and the Vinn node 825n is a differential input voltage of the output amplifier 820.

Embodiments are designed so that the two adjustable current sources 830 are nominally identical. The phrase "nominally identical" (and variants thereof) refers to a design intention of equivalence, interchangeability, etc., recognizing that it is impractical or impossible for components to be identical in real-world implementations of a circuit, or other manufactured product. For example, two current sources are considered herein to be "nominally identical" if they are designed or intended as copies of each other (i.e., as two instances of the same component), regardless of whether process variations and other real-world considerations will tend practically to prevent the current sources from being truly identical. Some of the circuits described herein seek at least partially to compensate for real-world implementation differences arising between nominally identical components.

The error amplifier 810 is configured as a feedback loop to control the two adjustable current sources 830, so that each generates a same sinusoidal current 835 (labeled as $I_{AC\_i}$ 835i and $I_{AC\_j}$ 835j for the ith and jth channels, respectively) following a sinusoidal driver signal that is output by the AC voltage source 815. As illustrated, a first (e.g., positive) input to the error amplifier 810 is coupled with the sinusoidal voltage source 815 to receive the sinusoidal driver signal. A second (e.g., negative) input to the error amplifier 810 is coupled with both branches (e.g., via respective resistors to convert the sinusoidal currents 835 to a voltage at the second input to the error amplifier 810). The output of the error amplifier 810 is used as the voltage control for both adjustable current sources 830.

With the error amplifier 810 in this feedback configuration, the sinusoidal currents 835 are forced to be equal. As such, any differential voltage between the Vinp node 825p and the Vinn node 825n is due to a difference between Ci 805i and Cj 805j. Thus, the output of the output amplifier, Vout 730i, will represent a difference in touch information between the ith and jth channels. For example, if Ctouch 205 is substantially zero in both branches (i.e., there is no touch condition local to either the ith or jth channel) and Cs 105 is substantially equal in both branches (i.e., substantially all of the display noise 225 is common to both branches), there will be substantially no differential voltage at the input to the output amplifier 820, and Vout 735i will be substantially zero. If Ctouch 205 in either channel is non-zero (i.e., there is a touch condition local to either the ith or jth channel) and Cs 105 remains substantially equal in both branches, there will be a differential voltage at the input to the output amplifier 820, which will generate a corresponding Vout 735i signal.

As noted above, the correlated display noise 225 at the Vinp node 825p and the Vinn node 825n manifest as common mode signal components. From the perspective of these common mode signals, because of the feedback loop to the error amplifier 810, the Vinp node 825p and the Vinn node 825n are both low-impedance nodes. Thus, the display noise 225 will be greatly mitigated at the inputs to the output amplifier 820. As such (e.g., in contrast to the voltage-mode bridge of FIG. 7), the display noise 225 will not tend to degrade the dynamic range of the output amplifier 820 and will not contribute a large amount of noise. Because of this appreciable reduction in the effect of display noise 225 on the sensitivity of the output amplifier 820, the AC-mode bridge approach can be implemented without relying on synchronization with display control signals. For example, the AC-mode bridge can be implemented without relying on additional complex signals and circuits that are dedicated to restricting operation of the sensing circuits only during time windows of low display noise. Further, because operation of the AC-mode bridge does not rely on such synchrony with the display signals, the frequency of the sinusoidal driver signal can be set independent of any particular display noise 225 profile.

Figure 9:
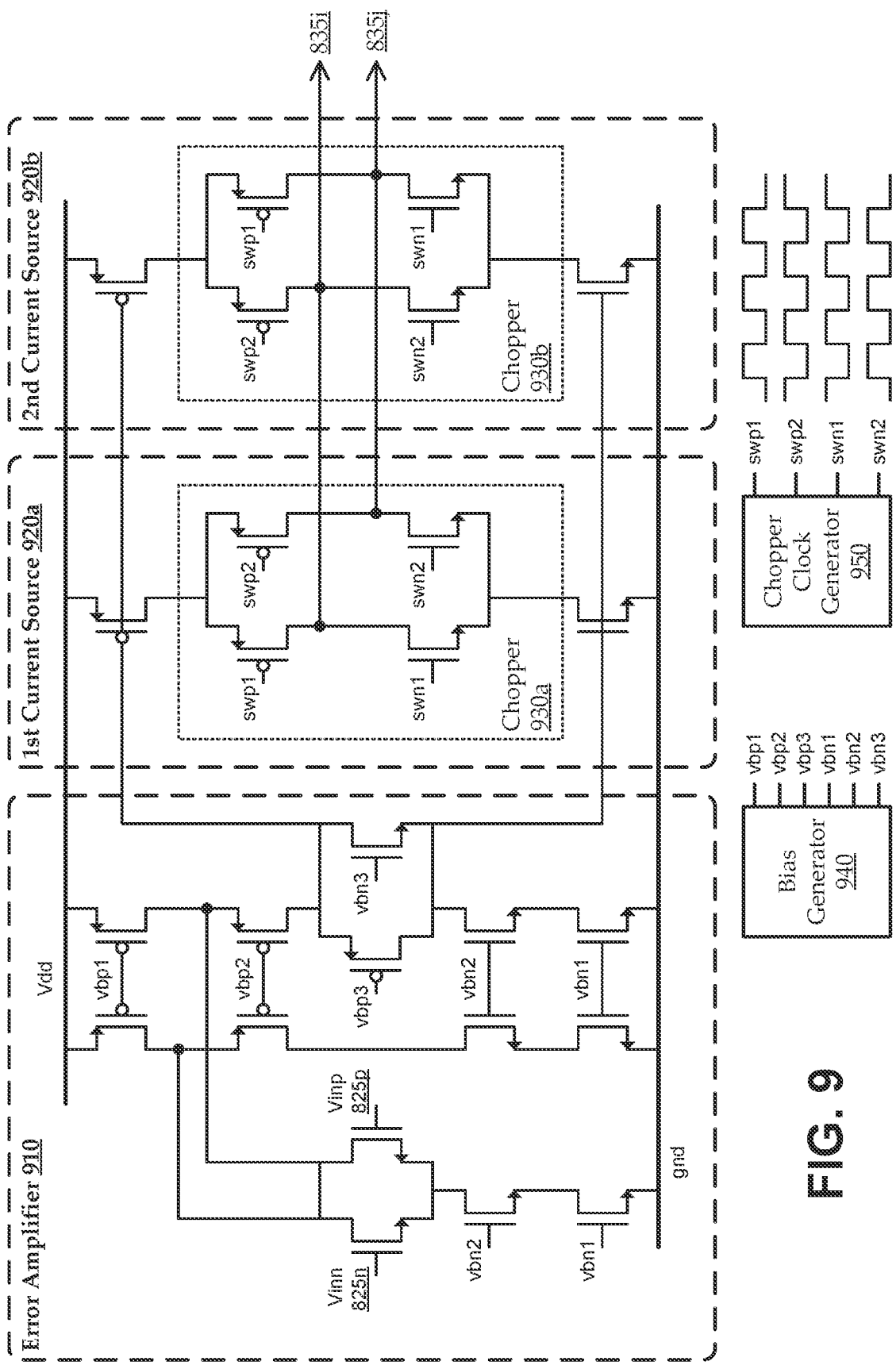
FIG. 9 shows a more detailed circuit diagram of an illustrative error amplifier and pair of adjustable current sources of an AC-mode bridge, according to embodiments described herein.

FIG. 9 shows a more detailed circuit diagram 900 of an illustrative error amplifier 910 and pair of adjustable current sources 920 of an AC-mode bridge, according to embodiments described herein. The error amplifier 910 is an illustrative implementation of the error amplifier 810 of FIG. 8, and the adjustable current sources 920 are illustrative implementations of the adjustable current sources 830 of FIG. 8. As illustrated, the error amplifier 910 takes the voltages Vinp 825p and Vinn 825n (corresponding to the voltages at Vinp node 825p and Vinn node 825n in FIG. 8) as inputs. The error amplifier 910 is implemented as complementary metal-oxide semiconductor (CMOS) operational amplifier, controlled by a six bias signals: vbp1, vbp2, vbp3, vbn1, vbn2, and vbn3. The bias signals can be generated by a bias generator 940, so that the error amplifier 810 outputs a sinusoid waveform corresponding to a difference between Vinp 825p and Vinn 825n.

In the illustrated implementation, the two adjustable current sources 920 are identically implemented. To save the static power, the adjustable current sources 920 are implemented as "class-AB" current sources. In each positive half-cycle of the sinusoid waveform, a PMOS portion of each adjustable current source 920 sources current; in each negative half-cycle of the sinusoid waveform, an NMOS portion of each adjustable current source 920 sinks the current. The class-AB current sources are designed to share the same control and have the same size transistors, such that each would produce the same output current.

Due to process variation and/or other real-world considerations, there will be some mismatch between the adjustable current sources 920 (e.g., differences between the performance of corresponding transistors in the two adjustable current sources 920) and also so-called "flicker noise" (e.g., resulting in mismatch between the PMOS and NMOS portions of each adjustable current source 920). To mitigate these types of noise, choppers 930 (labeled choppers 930*a* and 903*b* for adjustable current sources 920*a* and 920*b*, respectively) are added to the adjustable current sources 920 to toggle currents between two outputs. As illustrated, the two outputs are two currents, which can be sinusoidal currents 835*a* and 835*b* of FIG. 8. The choppers 930 are controlled by chopper clock signals (swp1, swp2, swn1, and swn2), which can be generated by a chopper clock generator 950. As illustrated, the chopper clock signals can be generally synchronous square waves, where swp1 and swn2 are in phase with each other, and swp2 and swn1 are in phase with each other and 180-degrees out of phase with swp1 and swn2. The chopper clock generator 950 is configured to generate the chopper clock signals so that the toggling occurs at a chopping frequency higher (e.g., appreciably higher) than the sinusoidal signal frequency. In this way, any mismatch and flicker noise can be moved out of the frequency band of the signal of interest (i.e., the sinusoidal signal), resulting in good in-band matching between the sinusoidal currents 835 generated by the adjustable current sources 920.

When differentially reading out all channels of a touch panel array, it can be desirable to form differential pairs with any channel directly adjacent to another; for most channels, there are directly adjacent channels to both sides. For example, in addition to differentially pairing channels 1 and 2, 3 and 4, 5 and 6, etc.; it can be desirable also to pair channels 2 and 3, 4 and 5, etc. While the illustrated implementation can remove mismatch and flicker noise between the adjustable current sources 920 for its differential output, this assumes that channels being differentially read out are coupled with the pair of adjustable current sources 920 in the same AC-mode bridge. However, the same may not hold if the differential output is taken from two channels coming from different pairs of adjustable current sources 920. To differentially read out all adjacent pairs, some embodiments perform each readout cycle as two readout frames. In each first readout frame, each channel is paired with one neighboring channel, and differential readings are taken between each of those pairs. In each second readout frame, each channel is paired with its other neighboring channel, and differential readings are taken between each of those pairs.

Figure 10B:
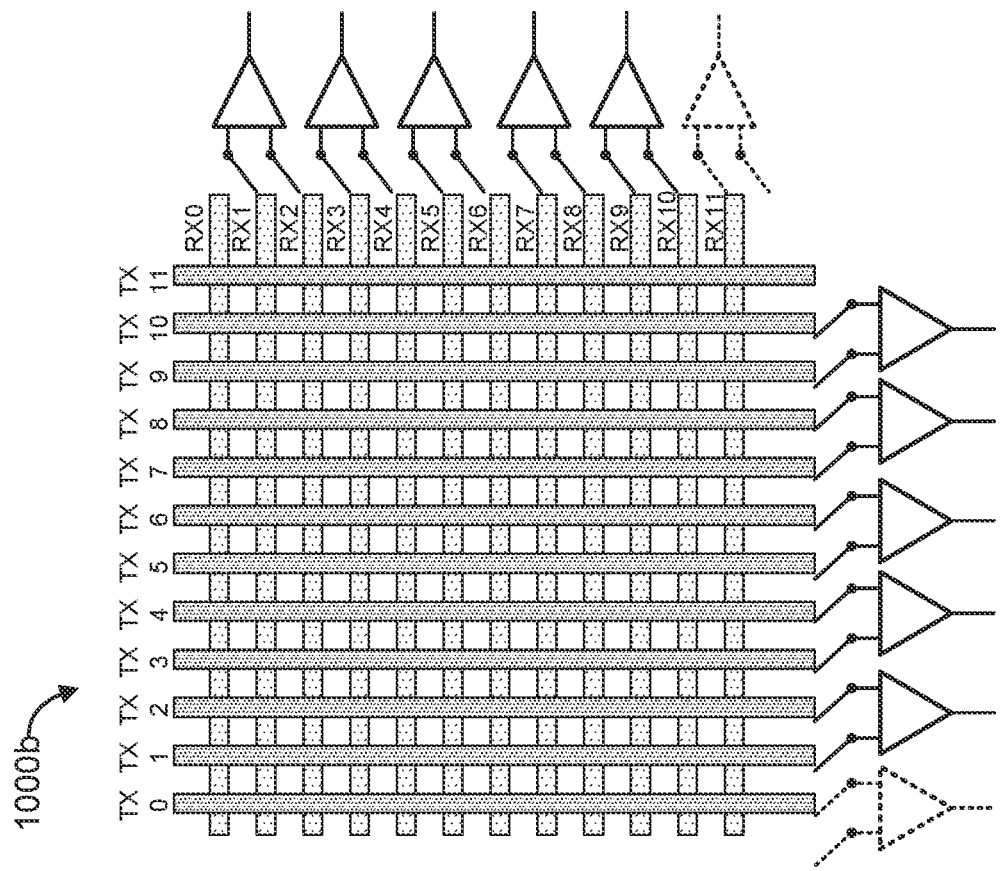
FIGS. 10A and 10B show illustrative touch panel arrays configured in an illustrative first readout frame and in an illustrative second readout frame, respectively.
Figure 10A:
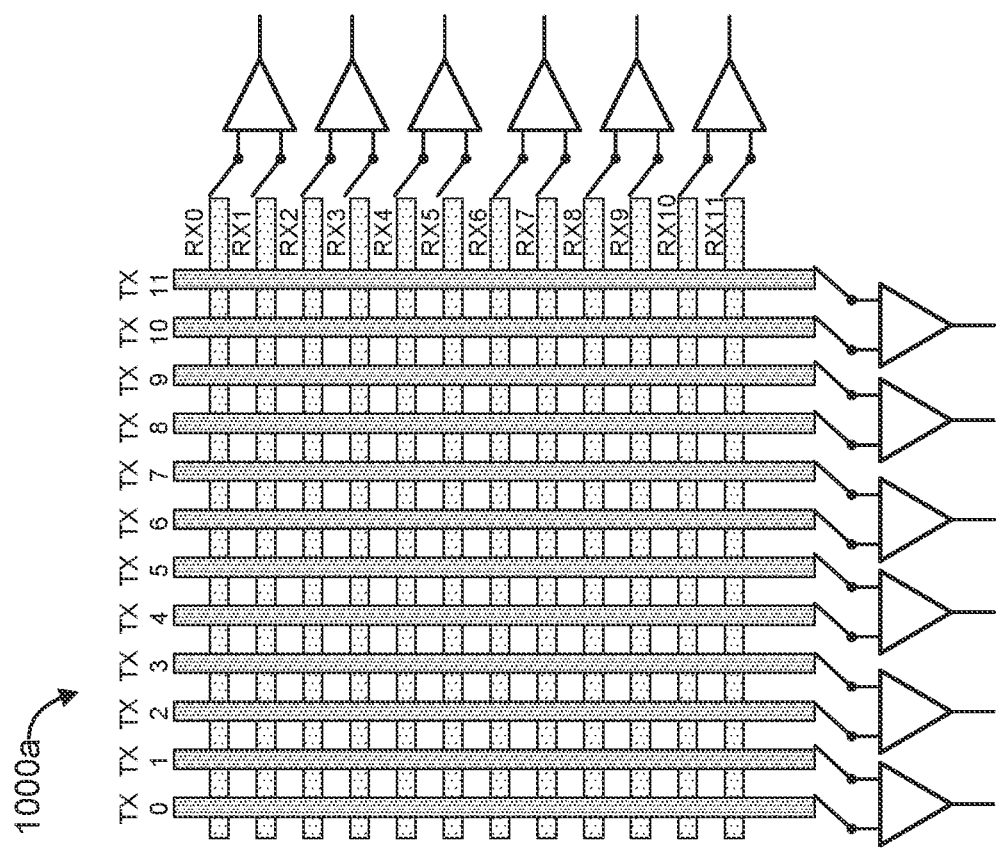

FIGS. 10A and 10B show illustrative touch panel arrays configured in an illustrative first readout frame 1000*a* and in an illustrative second readout frame 1000*b*, respectively. The touch panel array is illustrated as having several RX lines (labeled RX0-RX11) and several TX lines (labeled TX0-TX11). Switches are configured to selectively couple the lines to sensing circuits in a differential manner. In each readout frame, adjacent pairs of lines are coupled with sensing circuits to differentially read out the pair. For example, each readout of the array can include two or more readout frames. As illustrated, in the first readout frame 1000*a* (shown in FIG. 10A), the differential pairs are {RX0, RX1}, {RX2, RX3}, {RX4, RX5}, {RX6, RX7}, {RX8, RX9}, {RX10, RX11}, {TX0, TX1}, {TX2, TX3}, {TX4, TX5}, {TX6, TX7}, {TX8, TX9}, and {TX10, TX11}. In the second readout frame 1000*b* (shown in FIG. 10B), the switches are reconfigured to read out each line with the adjacent line to its other side. As illustrated, the differential pairs in the second readout frame are {RX1, RX2}, {RX3, RX4}, {RX5, RX6}, {RX7, RX8}, {RX9, RX10}, {TX1, TX2}, {TX3, TX4}, {TX5, TX6}, {TX7, TX8}, and {TX9, TX10}. In some implementations, an RX or TX line at an edge of the touch panel array may not be read out in both readout frames (e.g., the RX0 line is differentially paired with the RX1 line in the first readout frame but is not part of any differential pair in the second readout frame). In other implementations, an RX or TX line at an edge of the touch panel array may be differentially paired with a reference voltage (e.g., a common mode voltage reference) for read out in one of the readout frames.

In the illustrated implementation, TX and RX lines can be read out concurrently. This can save time and also power in the readout operation. Regardless of which direction the TX/RX channels are sensed, the same sinusoid stimulus can be applied. A mutual capacitor (Cm 110, as shown in FIG. 1) coupled between each respective TX line and RX line can ensure that both ends of Cm have the same voltage and any Cm change-induced interference is eliminated. As such, power is effectively wasted in driving the non-sensing direction. Concurrent reading of the TX lines and RX lines can salvage this power.

Figure 11:
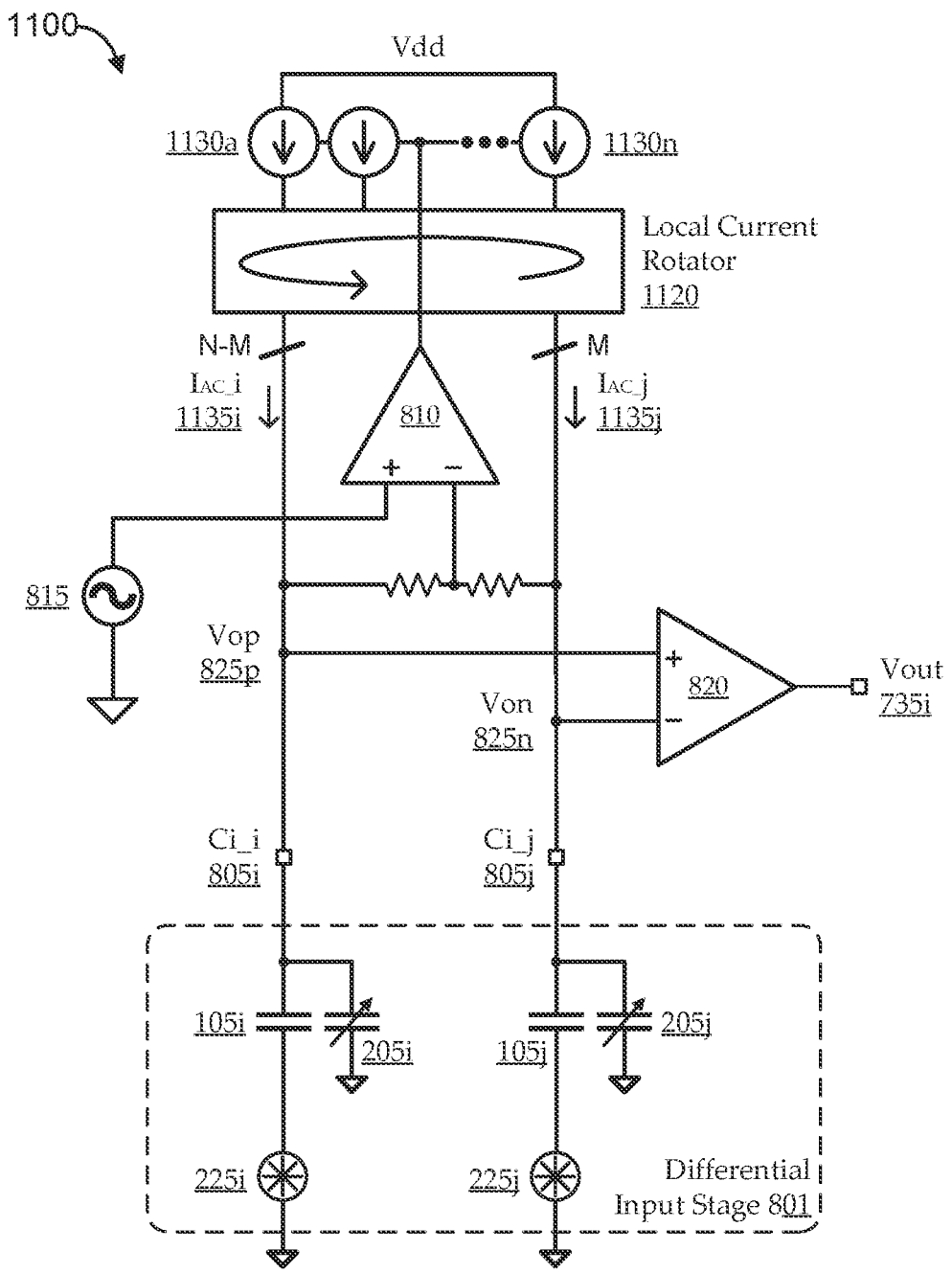
FIG. 11 shows a simplified circuit diagram of an illustrative self-capacitance-based touch sensing system that uses a novel AC-mode bridge with a local current rotator, according to embodiments described herein.

FIG. 11 shows a simplified circuit diagram 1100 of an illustrative self-capacitance-based touch sensing system that uses a novel AC-mode bridge with a local current rotator 1120, according to embodiments described herein. Except as otherwise described, the AC-mode bridge of FIG. 11 can operate in the same, or a similar manner to the AC-mode bridge of FIG. 8. The AC-mode bridge approach is coupled with a differential input stage 801 representing two touch sense channels of a touch panel array (an ith channel and a jth channel). Each channel has a respective total channel capacitance, Ci 805, labeled as Ci_i 805*i* and Ci_j 805*j*; which can include a respective base self-capacitance (Cs 105, labeled as 105*i* and 105*j* for the ith and jth channels, respectively) that capacitively couples display noise 225 from an integrated display panel, and a respective touch capacitance (Ctouch 205, labeled as 205*i* and 205*j* for the ith and jth channels, respectively) that is responsive to presence or absence of a touch event local to the associated channel.

As noted above, some embodiments operate based on an assumption that the base self-capacitance of the ith and jth channels, 105*i* and 105*j*, are very close (e.g., that any difference can be easily canceled by common-mode noise rejection at the output amplifier 820, etc.). For example, in the system illustrated in FIG. 8 can reliably operate by applying the same sinusoidal current 835 to both branches under the assumption that the channels feeding those branches have substantially the same base self-capacitance (i.e., they are capacitively coupling substantially the same display noise). However, the base capacitance of the ith and jth channels may not be sufficiently close for those embodiments to operate reliably in all cases. For example, even directly adjacent channels close to the edge of a touch panel array can manifest a large mismatch in respective base self-capacitance values, particularly if the edge area has a camera hole, a notch, or other features. In some such cases, the ratio of base self-capacitance between directly adjacent touch sense channels can be on the order of 2:1. The AC-mode bridge approach may not be effective in differentially canceling base self-capacitance values if the same sinusoidal current is applied to two branches having such a large mismatch in base self-capacitance.

Embodiments illustrated by FIG. 11 use a local current rotator 1120 to set an AC current ratio to match the ratio of base self-capacitance between the branches of the AC-mode bridge. As illustrated, the AC-mode bridge includes an AC current source 815, an error amplifier 810, an output amplifier 820, the local current rotator 1120, and N adjustable current sources 1130 (i.e., labeled as current sources 1130*a*-

1130n). In some implementations, N can be any suitable integer greater than two. In some implementations, N is at least ten. The local current rotator 1120 includes N rotator inputs and two rotator outputs. Each of the N rotator inputs is coupled with a respective one of the N adjustable current sources 1130, such that each input receives the current output of the adjustable current source 1130 coupled therewith. For example, each adjustable current source 1130 outputs approximately a same unit current (Iunit), such that the total current from all N adjustable current sources 1130 is approximately N*Iunit.

At each of the two rotator outputs, the local current rotator 1120 outputs a respective sinusoidal current 1135 (labeled as $I_{AC\_i}$ 1135i and $I_{AC\_j}$ 1135j). The first sinusoidal current $I_{AC\_i}$ 1135i is generated from a first set of N-M of the adjustable current sources 1130, and the second sinusoidal current $I_{AC\_j}$ 1135j is generated from a second set of M of the adjustable current sources 1130. The adjustable current sources 1130 are rotated by the local current rotator 1120 so that the first and second sets of adjustable current sources 1130 are made up of different ones of the adjustable current sources 1130 in each rotation. For example, in a first rotation, the first set is {130a, 1130b, 1130c} and the second set is {130d, 1130e} (i.e., N=5, M=2); and in a second rotation, the first set is {1130b, 1130c, 1130d} and the second set is {1130e, 1130a}.

M can be adjusted in any suitable manner. In one implementation, M is hard-coded in the local current rotator 1120. In another implementation, M is set (e.g., programmable) by one or more control signals, such as by a control processor (not shown). M is set so that the ratio of (N-M):M matches the ratio of the ith base self-capacitance 105i to the jth base self-capacitance 105j. M can be any suitable integer between one and N-1. For example, if there are 20 adjustable current sources 1130 (i.e., N=20), $I_{AC\_i}$ 1135i can be generated from 11 of the adjustable current sources 1130, and $I_{AC\_j}$ 1135j can be generated from the remaining 9 of the adjustable current sources 1130; or $I_{AC\_i}$ 1135i can be generated from 6 of the adjustable current sources 1130, and $I_{AC\_j}$ 1135j can be generated from the remaining 14 of the adjustable current sources 1130. The number (N) of adjustable current sources 1130 can effectively determine the resolution of the local current rotator 1120. For example, a higher N can add complexity to the circuit and can consume more area, power, etc.; but a higher N also facilitates finer tuning of the ratio between $I_{AC\_i}$ 1135i and $I_{AC\_j}$ 1135j.

Rotation of the adjustable current sources 1130 provides several features. First, semiconductor devices can produce so-called "flicker" noise (or "1/f" noise), and rotating among multiple adjustable current sources 1130 can effectively mitigate contributions of flicker noise coming from each device. Second, while all N adjustable current sources 1130 can be configured to nominally produce the same unit current, there will naturally be differences between the current sources (e.g., due to process variation among transistors, etc.), and rotating among multiple adjustable current sources 1130 can effectively smooth out those variations across the two branches of the AC-mode bridge. Further use of the local current rotator 1120 permits setting of a ratio of sinusoidal currents to compensate for mismatch in base self-capacitance between the ith and jth channels, so that a same circuit can be easily reconfigured to operate with different pairs of channels having different amounts of mismatch. Notably, the feedback to the error amplifier 810 comes from both branches of the AC-mode bridge, such that it is based on the total current of N*Iunit, regardless of the selected ratio.

Various embodiments are described above with different features and limitations. For example, two-current-source approaches, such as embodiments illustrated by FIG. 8, tend to have relatively low complexity, area consumption, power consumption, etc., but tend to rely on there being little to no mismatch in base self-capacitance between differentially sensed pairs of channels. In comparison, rotating-current-source approaches, such as embodiments illustrated by FIG. 11, tend to have relatively higher complexity, area consumption, power consumption, etc., but tend to operate with relatively large mismatch in base self-capacitance between differentially sensed pairs of channels. Some embodiments can implement sensing circuits for different channels of a touch panel array using a combination of rotating-current-source approaches. For example, it may be known that for the 15 percent of touch sense channels closest to the edges of a given touch panel array, there tends to be at least a 10-percent difference in base self-capacitance values between adjacent touch sense channels (e.g., the ratio tends to be greater than 1.1:1); while for the remaining 85 percent of touch sense channels, there tends to be less than a 10-percent difference in base self-capacitance values between adjacent touch sense channels. For such a touch panel array, a rotating-current-source approach can be used to implement sensing circuits for the 15 percent of touch sense channels closest to the edges, and a two-current-source approach can be used to implement sensing circuits for all other touch sense channels.

Figure 12:
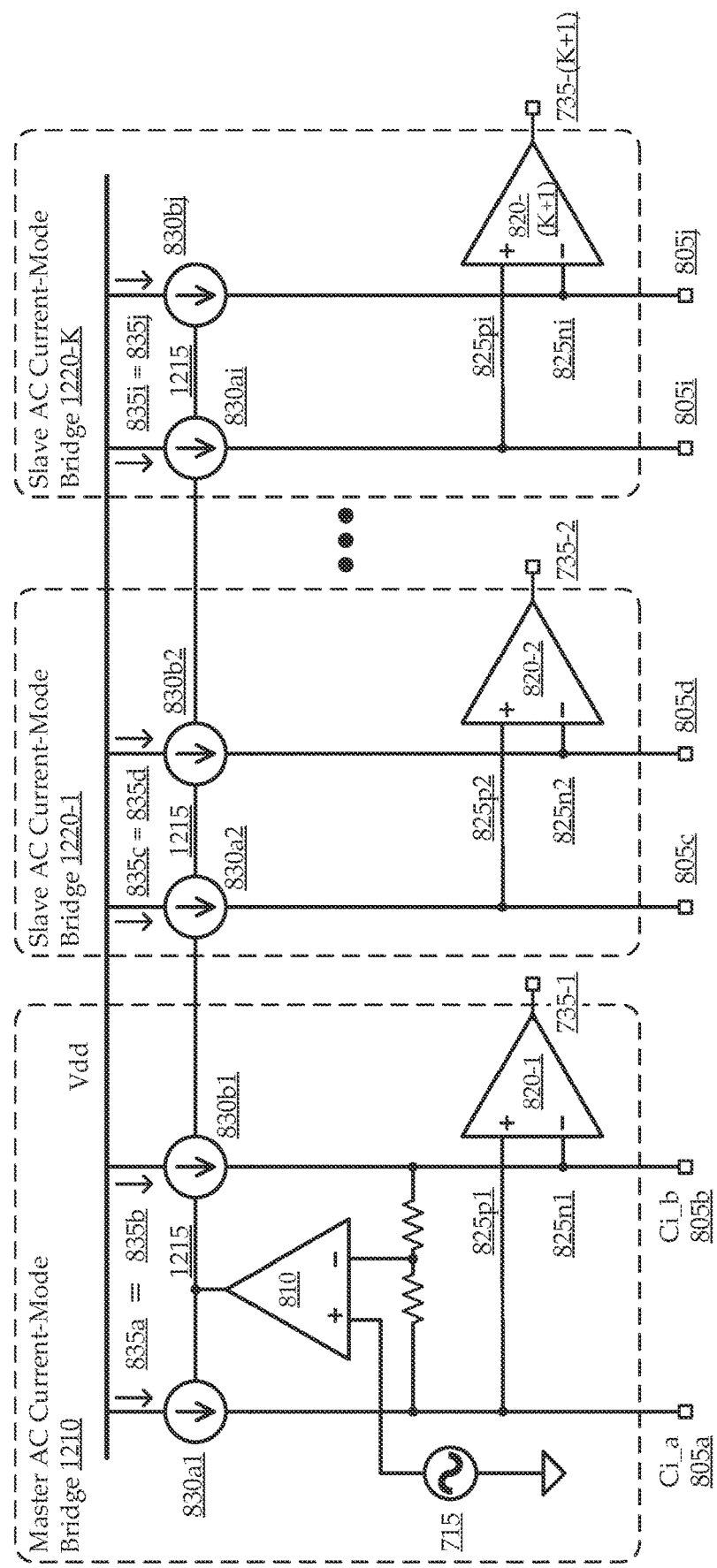
FIG. 12 shows a simplified circuit diagram of another illustrative self-capacitance-based touch sensing system that shares an error amplifier among several instances of an AC-mode bridge, according to embodiments described herein.

FIG. 12 shows a simplified circuit diagram 1200 of another illustrative self-capacitance-based touch sensing system that shares an error amplifier 810 among several instances of an AC-mode bridge, according to embodiments described herein. As illustrated, a set of K+1 instances of AC-mode bridges are each used to differentially sense a respective pair of touch sense channels, as described herein. The set of the K+1 AC-mode bridges includes a master AC-mode bridge 1210, and K slave AC-mode bridges 1220 (i.e., illustrated as slave AC-mode bridges 1120-1-1120-K). The master AC-mode bridge 1210 can be implemented according to any of the embodiments described herein. In the illustrated embodiment, the master AC-mode bridge 1210 is implemented according to the embodiments of FIG. 8 (i.e., according to a two-current-source approach). Alternatively, the master AC-mode bridge 1210 can be implemented according to a rotating-current-source approaches, such as described in FIG. 11.

As illustrated, the master AC-mode bridge 1210 has a pair of branches each coupled with a respective one of a first pair of touch sense channels (ath and bth channels) manifesting a first pair of self-capacitance values (Ci_a 805a and Ci_b 805b). For the sake of simplicity, it is assumed that the master AC-mode bridge 1210 operates in the same manner as described with reference to FIG. 8. Each of a first pair of adjustable current sources 830a1 and 830b1 generates a respective (nominally identical) sinusoidal current 835 (illustrated as 835a and 835b) for a respective one of the branches. An error amplifier 810 outputs a loop control voltage 1215, which controls the adjustable current sources 830a1 and 830b1 based on an AC current source 815 and feedback from the branches. In each branch, applying the respective sinusoidal current 835 to the respective self-capacitance produces a respective one of a first pair of branch input voltages (825p1 and 825n1) at inputs to a first output amplifier 820-1. The first output amplifier 820-1 thereby outputs a first Vout 735-1 corresponding to the difference between Ci_a 805a and Ci_b 805b.

As illustrated, each slave AC-mode bridge 1220 is configured to share the error feedback loop of the master AC-mode bridge 1210. In particular, rather than including its own instance of the error amplifier 810, each slave AC-mode bridge 1220 receives the loop control voltage 1215 output by the error amplifier 810 of the master AC-mode bridge 1210. Thus, in each slave AC-mode bridge 1220, the sinusoidal currents 835 in the branches are controlled based on the error feedback in the master AC-mode bridge 1210, and not based on feedback in the slave AC-mode bridge 1220.

For example, a first slave AC-mode bridge 1220-1 (i.e., a second AC-mode bridge of the set) has a pair of branches each coupled with a respective one of a second pair of touch sense channels (e.g., cth and dth channels) manifesting a second pair of self-capacitance values (805$c$ and 805$d$). Each of a second pair of adjustable current sources, 830$a2$ and 830$b2$, generates a respective sinusoidal current, 835$c$ and 835$d$, for a respective one of the branches of the first slave AC-mode bridge 1220-1 based on the shared loop control voltage 1215. As such, sinusoidal currents 835$c$ and 835$d$ are nominally identical both to each other and to sinusoidal currents 835$a$ and 835$b$ in the branches of the master AC-mode bridge 1210. In each branch, applying the respective sinusoidal current 835 to the respective self-capacitance produces a respective one of a second pair of branch voltages (825$p2$ and 825$n2$) at inputs to a second output amplifier 820-2, causing the second output amplifier 820-1 to output a second Vout 735-2 corresponding to the difference between 805$c$ and 805$d$.

Embodiments be implemented with any number of AC-mode bridges greater than one (i.e., K≥2). In one implementation, adjacent pairs of AC-mode bridges share an error amplifier 810 (i.e., K=2). For example, referring to FIGS. 10A and 10B, approximately T/2 sensing circuits (i.e., T/2 AC-mode bridges) may be used to sense T touch sense channels (i.e., T≥4; T=24 in FIGS. 10A and 10B), including approximately T/4 shared error amplifiers 810. In another implementation, sets of five AC-mode bridges share an error amplifier 810 (i.e., K=5). For example, T/2 sensing circuits can be implemented using T/10 shared error amplifiers 810. A feature of such embodiments is that sharing the error amplifier 810 among a set of multiple AC-mode bridges can reduce power, area, complexity, etc. A tradeoff is that each slave AC-mode bridge 1220 lacks its own error feedback, such that differences between the AC-mode bridges in the set may not be compensated, eliminated, etc. For example, such differences can arise from differences in common mode across different differential pairs of channels coupled to the different AC-mode bridges, and/or from process variations across components of the different AC-mode bridges.

Figure 13:
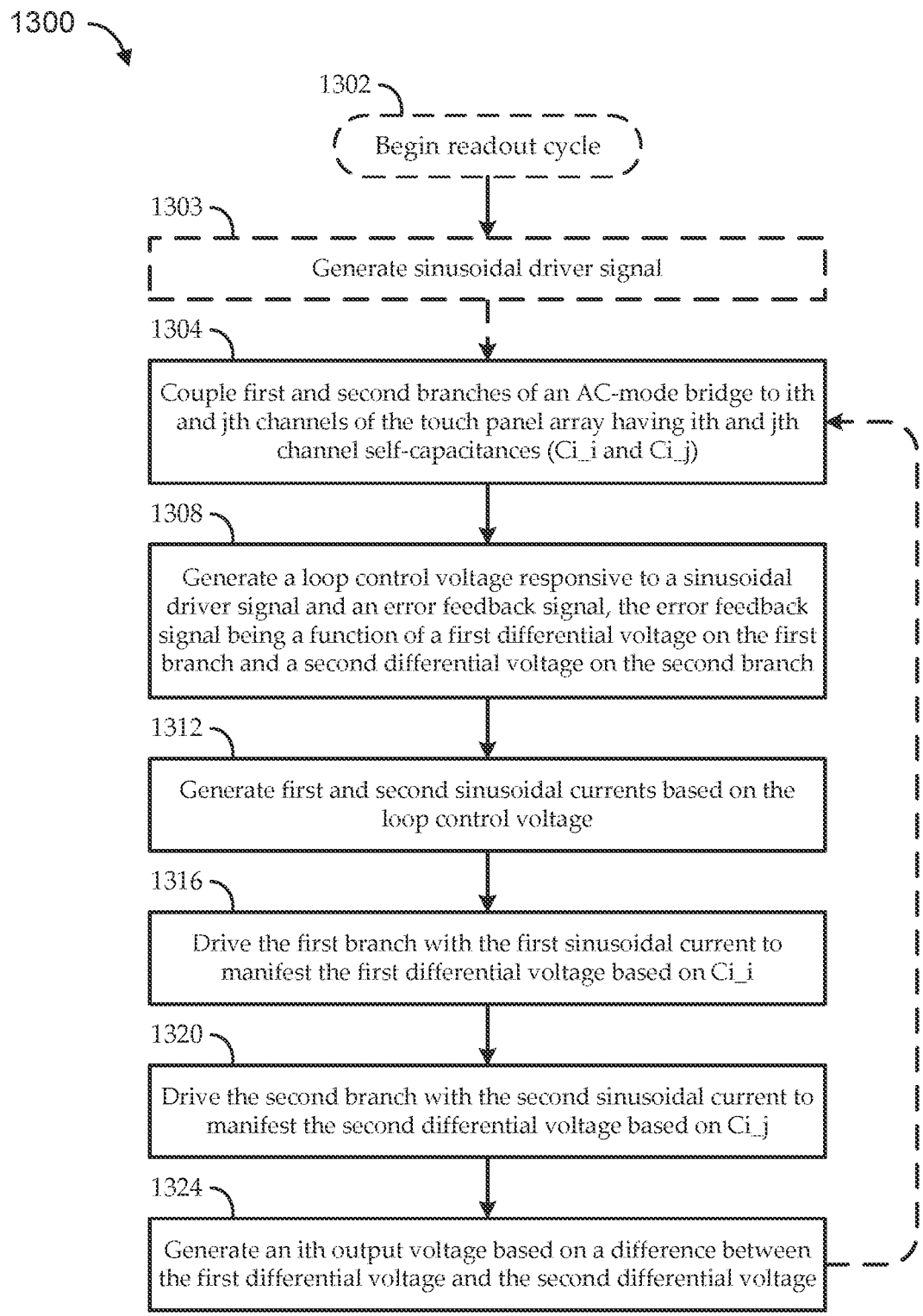
FIG. 13 shows a flow diagram of an illustrative method for self-capacitor sensing in a touch panel array, according to embodiments described herein.

FIG. 13 shows a flow diagram of an illustrative method 1300 for self-capacitor sensing in a touch panel array, according to embodiments described herein. As described herein, embodiments operate in context of a touch panel array integrated with a display panel. The touch panel array has multiple channels (e.g., touch sense channels, such as row lines and/or column lines). Each channel has a respective channel self-capacitance (Ci) that includes a respective base self-capacitance (Cs) corresponding to display noise capacitively coupled onto the channel from the display panel and a respective touch capacitance (Ctouch) that changes responsive to presence of a touch event local to the channel. The method 1300 can represent a readout cycle for a channel, which involves differential readout of two channels (e.g., two adjacent channels). For example, embodiments of the method 1300 can begin at stage 1302, labeled "begin readout cycle."

Embodiments of the method 1300 can proceed at stage 1304 by coupling a first branch of an alternating-current-mode (AC-mode) bridge to an ith channel of the touch panel array having an ith channel self-capacitance (Ci_i) and coupling a second branch of the AC-mode bridge to a jth channel of the touch panel array having a jth channel self-capacitance (Ci_j). As noted above, Ci_i can include an ith base self-capacitance (Cs_i) corresponding to ith display noise capacitively coupled onto the ith channel from the display panel and an ith touch capacitance (Ctouch_i) that changes responsive to presence of a touch event local to the ith channel, and Ci_j can include a jth base self-capacitance (Cs_j) corresponding to jth display noise capacitively coupled onto the jth channel from the display panel and a jth touch capacitance (Ctouch_j) that changes responsive to presence of a touch event local to the jth channel. Some embodiments assume that at least a portion of the ith and jth display noise is common-mode noise on the ith and jth channels, such that the first and second branch voltages include a common-mode component corresponding to the common-mode noise.

At stage 1308, embodiments can generate a loop control voltage responsive to a sinusoidal driver signal and an error feedback signal, the error feedback signal being a function of a first branch voltage on the first branch and a second branch voltage on the second branch. Some embodiments of the method 1300 include generating the sinusoidal driver signal at stage 1303.

At stage 1312, embodiments can generate first and second sinusoidal currents based on the loop control voltage generated at stage 1308. In some embodiments, the first sinusoidal current is generated by a first adjustable current source based on the loop control voltage, and the second sinusoidal current is generated by a second adjustable current source based on the loop control voltage. In such embodiments, the first and second adjustable current sources can be nominally identical, and the first and second sinusoidal currents can be nominally identical.

In some embodiments, the generating at stage 1312 involves toggling first and second adjustable current sources between a first configuration and a second configuration based on a set of chopper clock signals. In the first configuration, the generating at stage 1312 can involve generating the first sinusoidal current by a first CMOS portion (e.g., a PMOS portion) of the first adjustable current source and a second CMOS portion (e.g., an NMOS portion) of the second adjustable current source, and generating the second sinusoidal current by a second CMOS portion (e.g., an NMOS portion) of the first adjustable current source and a first CMOS portion (e.g., a PMOS portion) of the second adjustable current source. In the second configuration, the generating at stage 1312 can involve generating the second sinusoidal current by the first CMOS portion of the first adjustable current source and the second CMOS portion of the second adjustable current source, and generating the first sinusoidal current by the second CMOS portion of the first adjustable current source and the first CMOS portion of the second adjustable current source.

In some embodiments, the generating at stage 1312 involves generating a rotating N instances of a unit current (Iunit) generated by N nominally identical adjustable current sources. Each of the current sources is configured to output a respective instance of Iunit based on the loop control voltage. In such embodiments, the first sinusoidal current can be generated by combining N-M instances of the rotating N instances of Iunit, and the second sinusoidal current can be generated by combining M instances of the rotating N instances of Iunit, the M instances being distinct from the N-M instances. Some such embodiments further include setting M so that a ratio between N-M and M corresponds to a ratio between Cs_i and Cs_j.

At stage 1316, embodiments can drive the first branch with the first sinusoidal current to manifest the first branch voltage based on Ci_i. At stage 1320, embodiments can drive the second branch with the second sinusoidal current to manifest the second branch voltage based on Ci_j. At stage 1324, embodiments can generate an ith output voltage (Vout_i) based on a difference between the first branch voltage and the second branch voltage.

As illustrated, some embodiments of the method 1300 can cycle through the stages, such as by looping through at least stages 1304-1324. For example, a single readout cycle can include multiple (e.g., two) readout frames. In each readout frame, different pairs of channels of the touch panel array can be differentially read out. In one such embodiment, the method 1300 includes reading out the touch panel array by cycling between a first readout frame and a second readout frame. In each first readout frame, at least stages 1308-1324 are performed after, in stage 1304, coupling the first branch to a first channel of the touch panel array and coupling the second branch to a second channel of the touch panel array. In each second readout frame, at least stages 1308-1324 are repeated after, in stage 1304, coupling the first branch to the second channel and coupling the second branch to a third channel of the touch panel array.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A system for self-capacitor sensing in a touch panel array integrated with a display panel, the system comprising:
    an alternating-current-mode (AC-mode) bridge comprising:
        an error amplifier to generate a loop control voltage responsive to a sinusoidal driver signal and an error feedback signal;
        a first branch to couple with an ith channel of a touch panel array having an ith channel self-capacitance (Ci_i), and a second branch to couple with a jth channel of a touch panel array having a jth channel self-capacitance (Ci_j);
        a set of adjustable current sources configured, based on the loop control voltage, to output a first sinusoidal current to the first branch and to output a second sinusoidal current to the second branch,
        wherein the first branch manifests a first branch voltage responsive to applying the first sinusoidal current to Ci_i, and the second branch manifests a second branch voltage responsive to applying the second sinusoidal current to Ci_j, the error feedback signal being a function of the first branch voltage and the second branch voltage; and
        an output amplifier to generate an ith output voltage (Vout_i) based on a difference between the first branch voltage and the second branch voltage.

2. The system of claim 1, wherein:
    Ci_i includes an ith base self-capacitance (Cs_i) corresponding to ith display noise capacitively coupled onto the ith channel from the display panel and an ith touch capacitance (Ctouch_i) that changes responsive to presence of a touch event local to the ith channel;
    Ci_j includes a jth base self-capacitance (Cs_j) corresponding to jth display noise capacitively coupled onto the jth channel from the display panel and a jth touch capacitance (Ctouch_j) that changes responsive to presence of a touch event local to the jth channel; and
    at least a portion of the ith and jth display noise is common-mode noise on the ith and jth channels, such that the first and second branch voltages include a common-mode component corresponding to the common-mode noise.

3. The system of claim 1, wherein the AC-mode bridge further comprises:
    an AC source coupled with the error amplifier and configured to generate the sinusoidal driver signal.

4. The system of claim 1, wherein the set of adjustable current sources comprises:
a first adjustable current source configured to output the first sinusoidal current based on the loop control voltage; and
a second adjustable current source configured to output the second sinusoidal current based on the loop control voltage,
the first and second adjustable current sources being nominally identical, and the first and second sinusoidal currents being nominally identical.

5. The system of claim 1, wherein the set of adjustable current sources comprises:
a first adjustable current source having a first chopper, a first complementary metal-oxide semiconductor (CMOS) portion, and a second CMOS portion; and
a second adjustable current source having a second chopper, a third CMOS portion, and a fourth CMOS portion, wherein the first chopper and the second chopper are configured to toggle between a first configuration and a second configuration based on a set of chopper clock signals, such that:
in the first configuration, the first sinusoidal current is generated by the first and fourth CMOS portions, and the second sinusoidal current is generated by the third and second CMOS portions; and
in the second configuration, the second sinusoidal current is generated by the first and fourth CMOS portions, and the first sinusoidal current is generated by the third and second CMOS portions.

6. The system of claim 1, wherein:
readout of the touch panel array cycles between a first readout frame and a second readout frame;
in each first readout frame, the first branch is to couple with a first channel of the touch panel array, and the second branch is to couple with a second channel of the touch panel array; and
in each second readout frame, the first branch is to couple with the second channel of the touch panel array, and the second branch is to couple with a third channel of the touch panel array.

7. The system of claim 1, wherein the set of adjustable current sources comprises:
N adjustable current sources, each configured to output a nominally identical unit current (Iunit) based on the loop control voltage; and
a local current rotator having:
N rotator inputs each to receive the Iunit from a respective one of the N adjustable current sources;
a first rotator output to output the first sinusoidal current to the first branch based on a rotating combination of N-M of the N adjustable current sources; and
a second rotator output to output the second sinusoidal current to the second branch based on a rotating combination of M of the N adjustable current sources distinct from the N-M of the N adjustable current sources,
wherein N is an integer greater than 2, and M is an integer between 1 and N-1.

8. The system of claim 7, wherein:
M is set so that a ratio between N-M and M corresponds to a ratio between Cs_i and Cs_j.

9. The system of claim 1, wherein the AC-mode bridge is a master AC-mode bridge, and further comprising:
K slave AC-mode bridges, each coupled with the error amplifier and comprising:
a respective first branch to couple with a respective first channel of the touch panel array;
a respective second branch to couple with a respective second channel of the touch panel array;
a respective set of adjustable current sources configured, based on the loop control voltage, to output a respective first sinusoidal current to the respective first branch and to output a respective second sinusoidal current to the respective second branch, such that the respective first branch manifests a respective first branch voltage based on applying the respective first sinusoidal current to a respective first channel self-capacitance of the respective first channel, and the respective second branch manifests a respective second branch voltage based on applying the respective second sinusoidal current to a respective second channel self-capacitance of the respective second channel; and
an output amplifier to generate a respective output voltage based on a difference between the respective first branch voltage and the respective second branch voltage.

10. The system of claim 1, further comprising:
the touch panel array having a plurality of channels including the ith and jth channels, each channel having a respective channel self-capacitance; and
a plurality of instances of the AC-mode bridge, each configured to couple with a respective pair of the plurality of channels.

11. The system of claim 10, further comprising:
the display panel.

12. The system of claim 1, wherein:
the plurality of channels is T channels; and
a plurality of instances of the AC-mode bridge is fewer than T instances.

13. A method for self-capacitor sensing in a touch panel array integrated with a display panel, the method comprising:
(a) coupling a first branch of an alternating-current-mode (AC-mode) bridge to an ith channel of the touch panel array having an ith channel self-capacitance ($Ci\_i$), and coupling a second branch of the AC-mode bridge to a jth channel of the touch panel array having a jth channel self-capacitance ($Ci\_j$);
(b) generating a loop control voltage responsive to a sinusoidal driver signal and an error feedback signal, the error feedback signal being a function of a first branch voltage on the first branch and a second branch voltage on the second branch;
(c) generating first and second sinusoidal currents based on the loop control voltage;
(d) driving the first branch with the first sinusoidal current to manifest the first branch voltage based on $Ci\_i$;
(e) driving the second branch with the second sinusoidal current to manifest the second branch voltage based on $Ci\_j$; and
(f) generating an ith output voltage ($Vout\_i$) based on a difference between the first branch voltage and the second branch voltage.

14. The method of claim 13, wherein:
$Ci\_i$ includes an ith base self-capacitance ($Cs\_i$) corresponding to ith display noise capacitively coupled onto the ith channel from the display panel and an ith touch capacitance ($Ctouch\_i$) that changes responsive to presence of a touch event local to the ith channel;
$Ci\_j$ includes a jth base self-capacitance ($Cs\_j$) corresponding to jth display noise capacitively coupled onto the jth channel from the display panel and a jth touch capacitance (Ctouch_j) that changes responsive to presence of a touch event local to the jth channel; and at least a portion of the ith and jth display noise is common-mode noise on the ith and jth channels, such that the first and second branch voltages include a common-mode component corresponding to the common-mode noise.

15. The method of claim 13, further comprising:
generating the sinusoidal driver signal by an AC source.

16. The method of claim 13, wherein:
the first sinusoidal current is generated by a first adjustable current source based on the loop control voltage; and the second sinusoidal current is generated by a second adjustable current source based on the loop control voltage, the first and second adjustable current sources being nominally identical, and the first and second sinusoidal currents being nominally identical.

17. The method of claim 13, wherein the generating the first and second sinusoidal currents based on the loop control voltage comprises:

toggling first and second adjustable current sources between a first configuration and a second configuration based on a set of chopper clock signals, such that:

in the first configuration, the generating the first and second sinusoidal currents comprises generating the first sinusoidal current by a first CMOS portion of the first adjustable current source and a second CMOS portion of the second adjustable current source, and generating the second sinusoidal current by a second CMOS portion of the first adjustable current source and a first CMOS portion of the second adjustable current source; and in the second configuration, the generating the first and second sinusoidal currents comprises generating the second sinusoidal current by the first CMOS portion of the first adjustable current source and the second CMOS portion of the second adjustable current source, and generating the first sinusoidal current by the second CMOS portion of the first adjustable current source and the first CMOS portion of the second adjustable current source.

18. The method of claim 13, further comprising:
reading out the touch panel array by cycling between a first readout frame and a second readout frame, by:

in each first readout frame, performing steps (a)-(f), wherein step (a) is performed by coupling the first branch to a first channel of the touch panel array and coupling the second branch to a second channel of the touch panel array; and in each second readout frame, performing steps (a)-(f), wherein step (a) is performed by coupling the first branch to the second channel and coupling the second branch to a third channel of the touch panel array.

19. The method of claim 13, wherein the generating the first and second sinusoidal currents based on the loop control voltage comprises:

generating a rotating N instances of a unit current (Iunit) generated by N nominally identical adjustable current sources, each configured to output a respective instance of Iunit based on the loop control voltage;

generating the first sinusoidal current by combining N-M instances of the rotating N instances of Iunit; and generating the second sinusoidal current by combining M instances of the rotating N instances of Iunit, the M instances being distinct from the N-M instances.

20. The method of claim 19, further comprising:
setting M so that a ratio between N-M and M corresponds to a ratio between Cs_i and Cs_j, Cs_i being a base self-capacitance portion of Ci_i corresponding to display noise capacitively coupled onto the ith channel, and Cs_j being a base self-capacitance portion of Ci_j corresponding to display noise capacitively coupled onto the jth channel.

* * * * *